(12) United States Patent
Jotwani et al.

(10) Patent No.: US 11,869,144 B1
(45) Date of Patent: Jan. 9, 2024

(54) MODELING A PHYSICAL ENVIRONMENT BASED ON SALIENCY

(71) Applicant: Apple Inc., Cupertino, CA (US)

(72) Inventors: Payal Jotwani, Santa Clara, CA (US); Bo Morgan, Emerald Hills, CA (US); Behrooz Mahasseni, San Jose, CA (US); Bradley W. Peebler, Emerald Hills, CA (US); Dan Feng, Sunnyvale, CA (US); Mark E. Drummond, Palo Alto, CA (US); Siva Chandra Mouli Sivapurapu, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 22 days.

(21) Appl. No.: 17/678,229

(22) Filed: Feb. 23, 2022

Related U.S. Application Data

(60) Provisional application No. 63/156,065, filed on Mar. 3, 2021.

(51) Int. Cl.
| | |
|---|---|
| *G06T 19/00* | (2011.01) |
| *G06T 17/00* | (2006.01) |
| *G06T 15/04* | (2011.01) |
| *G06V 10/46* | (2022.01) |

(52) U.S. Cl.
CPC .............. *G06T 17/00* (2013.01); *G06T 15/04* (2013.01); *G06V 10/462* (2022.01)

(58) Field of Classification Search
CPC ........ G06F 1/163; G06F 18/21; G06F 18/241; G06F 3/013; G06F 3/012; G06F 3/04815; G06T 7/11; G06T 2207/20021; G06T 17/00; G06T 15/00; G06T 19/00; G06V 10/462
See application file for complete search history.

(56) References Cited

U.S. PATENT DOCUMENTS

| | | | |
|---|---|---|---|
| 9,298,980 B1 | 3/2016 | Yuan et al. | |
| 9,466,098 B2 | 10/2016 | Ballestad et al. | |
| 10,055,850 B2 | 8/2018 | Piekniewski et al. | |
| 10,379,612 B1 | 8/2019 | Bonnier et al. | |
| 2011/0287811 A1 | 11/2011 | Mattila et al. | |
| 2016/0117947 A1* | 4/2016 | Misu ................... | B60W 50/085 434/62 |
| 2017/0316280 A1* | 11/2017 | Caldwell .............. | G06V 10/462 |
| 2019/0244360 A1* | 8/2019 | Oniki ..................... | H04N 23/60 |
| 2019/0317594 A1* | 10/2019 | Stent .................... | G06V 10/143 |
| 2021/0035264 A1* | 2/2021 | Li ........................ | H04N 13/139 |

* cited by examiner

*Primary Examiner* — Hau H Nguyen
(74) *Attorney, Agent, or Firm* — Fernando & Partners, LLP

(57) ABSTRACT

In some implementations, a device includes one or more sensors, one or more processors and a non-transitory memory. In some implementations, a method includes determining that a first portion of a physical environment is associated with a first saliency value and a second portion of the physical environment is associated with a second saliency value that is different from the first saliency value. In some implementations, the method includes obtaining, via the one or more sensors, environmental data corresponding to the physical environment. In some implementations, the method includes generating, based on the environmental data, a model of the physical environment by modeling the first portion with a first set of modeling features that is a function of the first saliency value and modeling the second portion with a second set of modeling features that is a function of the second saliency value.

21 Claims, 14 Drawing Sheets

300

Determine first and second saliency values for first and second portions of env.
- User-specified saliency values 310a
- Different portions correspond to different articles or same article 310b
- Determine saliency values based on known saliency values 310c
- Obtain a request to generate a model 310d
- Determine saliency values based on gaze data 310e
- Saliency values indicate estimated user interest 310f

⎫ 310

Obtain environmental data corresponding to environment
- Environmental data includes image data or depth data 320a
- Prompt to capture additional data 320b
- Obtain different amounts of data for different portions of env. 320c

⎫ 320

Generate a model by modeling different portions with different sets of features
- Model is a graphical environment 330a
- Model is a texture map 330b
- Number of modeling features is a function of saliency values 330c
- Modeling features include affordance(s) 330d

MODELING A PHYSICAL ENVIRONMENT BASED ON SALIENCY

CROSS-REFERENCE TO RELATED APPLICATION

This application claims the benefit of U.S. Provisional Patent App. No. 63/156,065, filed on Mar. 3, 2021, which is incorporated by reference in its entirety.

TECHNICAL FIELD

The present disclosure generally relates to modeling a physical environment based on saliency.

BACKGROUND

Some devices are capable of generating and presenting graphical environments that include many objects. These objects may mimic real world objects. These environments may be presented on mobile communication devices.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 3 is a flowchart representation of a method of modeling a physical environment in accordance with some implementations.

Figure 1A:
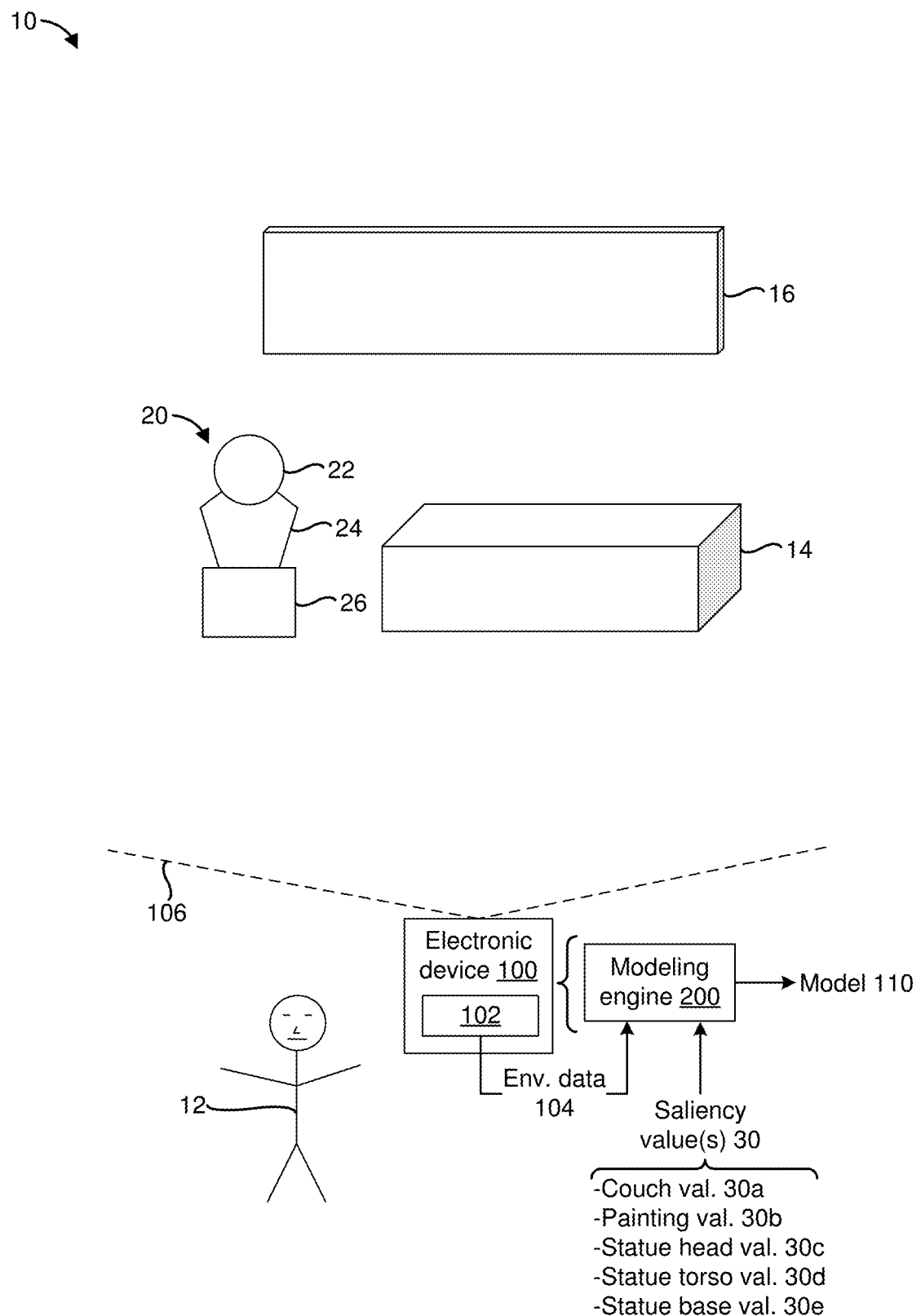
FIGS. 1A-1K are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for modeling a physical environment based on saliency. In some implementations, a device includes one or more sensors, one or more processors and a non-transitory memory. In some implementations, a method includes determining that a first portion of a physical environment is associated with a first saliency value and a second portion of the physical environment is associated with a second saliency value that is different from the first saliency value. In some implementations, the method includes obtaining, via the one or more sensors, environmental data corresponding to the physical environment. In some implementations, the method includes generating, based on the environmental data, a model of the physical environment by modeling the first portion with a first set of modeling features that is a function of the first saliency value and modeling the second portion with a second set of modeling features that is a function of the second saliency value.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Increasing a resolution at which a physical environment is scanned is resource-intensive. For example, storing high resolution images of the entire physical environment may unnecessarily occupy a relatively large amount of storage space in memory. Furthermore, generating a model of the physical environment in which the entire physical environment is represented by the same number of modeling features can be resource-intensive. For example, generating a graphical environment with a uniform pixel density in order to use the same pixel density to represent all physical articles may result in a model that unnecessarily occupies a relatively large amount of storage space in memory. Since generating content at relatively high pixel density tends to be more computationally-intensive than generating content at relatively low pixel density, using a relatively high pixel density for the entire graphical environment tends to be more computationally-intensive than using a relatively low pixel density for the entire graphical environment. However, using a relatively low pixel density to represent certain physical articles may adversely impact viewability and detract from a user experience.

As another example, using the same polygon density in a texture map of the physical environment may result in a texture map that unnecessarily occupies a relatively large amount of storage space in memory. Since generating a texture map using a relatively high polygon density tends to be more computationally-intensive than generating a texture map using a relatively low polygon density, using a relatively high polygon density for the entire texture map tends to be more computationally-intensive than using a relatively low polygon density for the entire texture map. However, using a relatively low polygon density to represent certain physical articles may adversely impact viewability and detract from a user experience.

The present disclosure provides methods, systems, and/or devices for utilizing saliency to generate a model of a physical environment. A device can utilize saliency values associated with respective portions of a physical environment to model the portions of the physical environment in different manners. The device can generate the model such that the model uses different sets of modeling features to model different portions of the physical environment based on the saliency values associated with the portions of the physical environment. Utilizing different sets of modeling features to model different portions of the physical environment allows the device to conserve computing resources by using less computationally-intensive modeling features to model less salient portions of the physical environment while using more computationally-intensive modeling features to model more salient portions of the physical environment. Utilizing less computationally-intensive modeling features to model less salient portions of the physical environment while using more computationally-intensive modeling features to model more salient portions of the physical environment tends to result in a model that occupies less storage space in memory thereby conserving memory.

In some implementations, the model includes a graphical environment that represents the physical environment, and the modeling features are pixel densities. The device can use a relatively low pixel density to represent less salient portions of the physical environment in the graphical environment and a relatively high pixel density to represent more salient portions of the physical environment in the graphical environment. Since generating content with a higher pixel density tends to be more computationally-intensive than generating content with a lower pixel density, the device conserves computing resources by using a lower pixel density to represent less salient portions of the physical environment and maintains a quality of the user experience by using a higher pixel density to represent more salient portions of the physical environment. Since content generated at a higher pixel density tends to occupy more storage space in memory than content generated at a lower pixel density, the device conserves memory by using a lower pixel density to represent less salient portions of the physical environment and maintains a quality of the user experience by using a higher pixel density to represent more salient portions of the physical environment.

In some implementations, the model includes a texture map of the physical environment, and the modeling features are polygon densities in the texture map. The device can use a relatively low polygon density to map less salient portions of the physical environment in the texture map and a relatively high polygon density to map more salient portions of the physical environment in the texture map. Since using a higher polygon density tends to be more computationally-intensive than using a lower polygon density, the device conserves computing resources by using a lower polygon density for less salient portions of the physical environment and maintains a quality of the user experience by using a higher polygon density for more salient portions of the physical environment. Since textures generated at a higher polygon density tend to occupy more storage space in memory than textures generated at a lower polygon density, the device conserves memory by using a lower polygon density to map less salient portions of the physical environment and maintains a quality of the user experience by using a higher polygon density to map more salient portions of the physical environment.

The device generates the model based on environmental data captured by one or more sensors. For example, the device generates the model based on image data captured by an image sensor (e.g., a camera, for example, a visible light camera or an infrared light camera). As another example, the device generates the model based on depth data captured by a depth sensor (e.g., a depth camera). In some implementations, the device captures different amounts of environmental data for different portions of the physical environment based on their corresponding saliency values. For example, the device captures relatively less environmental data for portions of the physical environment with saliency values that are less a threshold saliency value, and the device captures relatively more environmental data for portions of the physical environment with saliency values that are greater than the threshold saliency value. As an example, the device may capture high resolution images that occupy more storage space for portions of the physical environment with saliency values that are greater than the threshold saliency value, and the device may capture low resolution images that occupy less storage space for portions of the physical environment with saliency values that are less than the threshold saliency value. As another example, the device may capture a single image of a first portion of a physical environment with a first saliency value that is less than a threshold saliency value, and the device may capture multiple images of a second portion of the physical environment with a second saliency value that is greater than the threshold saliency value. Since capturing environmental data utilizes computing resources and storing the environmental data utilizes storage resources, capturing less environmental data for less salient portions of the physical environment conserves computing and storage resources, while capturing more environmental data for more salient portions of the physical environment allows the device to generate a model of the physical environment that satisfies a suitability criterion. For example, the device captures sufficient environmental data for more salient portions of the physical environment to generate a model that includes an appropriate amount of information regarding the more salient portions of the physical environment.

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 100 and a modeling engine 200. In some implementations, the electronic device 100 includes a handheld computing device that can be held by a user 12. For example, in some implementations, the electronic device 100 includes a smartphone, a tablet, a media player, a laptop, or the like. In some implementations, the electronic device 100 includes a wearable computing device that can be worn by the user 12. For example, in some implementations, the electronic device 100 includes a head-mountable device (HMD) or an electronic watch.

In the example of FIG. 1A, the modeling engine 200 resides at the electronic device 100. For example, the electronic device 100 implements the modeling engine 200. In some implementations, the electronic device 100 includes a set of computer-readable instructions corresponding to the modeling engine 200. Although the modeling engine 200 is shown as being integrated into the electronic device 100, in some implementations, the modeling engine 200 is separate from the electronic device 100. For example, in some implementations, the modeling engine 200 resides at another device (e.g., at a controller, a server or a cloud computing platform).

In some implementations, the physical environment 10 includes various physical articles. In the example of FIG. 1A, the physical environment 10 includes a couch 14, a painting 16 and a statue 20. In some implementations, at least some of the physical articles include various parts. For example, the statue 20 includes a head 22, a torso 24 and a base 26.

In some implementations, the electronic device 100 includes an environmental sensor 102 (hereafter "sensor 102") that captures environmental data 104 corresponding to a portion of the physical environment 10 that is in a field of detection 106 (e.g., a field of view) of the sensor 102. In some implementations, the sensor 102 includes an image sensor (e.g., a camera, for example, a visible light camera and/or an infrared light camera) and the environmental data 104 includes image data (e.g., a set of one or more images) captured by the image sensor. In some implementations, the sensor 102 includes a depth sensor (e.g., a depth camera) and the environmental data 104 includes depth data captured by the depth sensor. In various implementations, the electronic device 100 (e.g., the sensor 102) provides the environmental data 104 to the modeling engine 200.

In various implementations, the modeling engine 200 generates a model 110 of the physical environment based on the environmental data 104 and a set of one or more saliency values (hereafter "saliency values 30"). In some implementations, the saliency values 30 are associated with respective portions of the physical environment 10. For example, in some implementations, the saliency values 30 are associated with respective physical articles in the physical environment In the example of FIG. 1A, the saliency values 30 include a couch saliency value 30a for the couch 14, a painting saliency value 30b for the painting 16, a statue head saliency value 30c for the head 22 of the statue 20, a statue torso saliency value 30d for the torso 24 of the statue 20, and a statue base saliency value 30e for the base 26 of the statue 20.

In some implementations, the saliency values 30 indicate respective saliency levels of the corresponding portions of the physical environment 10. In some implementations, the saliency values 30 indicate respective levels of user interest (e.g., estimated amounts of user interest) in the corresponding portions of the physical environment 10. For example, the couch saliency value 30a indicates a first estimated amount of interest of the user 12 to view the couch 14, the painting saliency value 30b indicates a second estimated amount of interest of the user 12 to view the painting 16, the statue head saliency value 30c indicates a third estimated amount of interest of the user 12 to view the head 22 of the statue 20, the statue torso saliency value 30d indicates a fourth estimated amount of interest of the user 12 to view the torso 24 of the statue 20, and the statue base saliency value 30e indicates a fifth estimated amount of interest of the user 12 to view the base 26 of the statue 20.

In some implementations, the electronic device 100 and/or the modeling engine 200 determine the saliency values 30 based on a user input (e.g., based on an explicit user input and/or an implicit user input). For example, in some implementations, the user 12 specifies the saliency values 30 via the electronic device 100. In some implementations, the electronic device 100 and/or modeling engine 200 determine the saliency values 30 based on gaze data and/or head pose data, to the extent such data is made available, that indicate where the user 12 is looking. For example, in some implementations, the saliency values 30 are a function of (e.g., proportional to) amounts to time for which the user 12 looked at the corresponding portions of the physical environment 10. For example, the couch saliency value 30a is proportional to a first amount of time that the user 12 gazed at the couch 14, the painting saliency value 30b is proportional to a second amount of time that the user 12 gazed at the painting 16, the statue head saliency value 30c is proportional to a third amount of time that the user 12 gazed at the head 22 of the statue 20, the statue torso saliency value 30d is proportional to a fourth amount of time that the user 12 gazed at the torso 24 of the statue 20, and the statue base saliency value 30e is proportional to a fifth amount of time that the user 12 gazed at the base 26 of the statue 20.

In some implementations, the electronic device 100 and/or the modeling engine 200 determine the saliency values 30 based on known saliency values of objects that are similar to the physical articles in the physical environment 10. For example, in some implementations, the electronic device 100 and/or the modeling engine 200 determine the painting saliency value 30b based on a known saliency value for a wall hanging. Similarly, in some implementations, the electronic device 100 and/or the modeling engine 200 determine the statue head saliency value 30c based on a known saliency value for a head of a sculpture.

It should be understood that while the use of gaze information could improve the delivery of immersive content to the user, such optimizations should be done in a way that is in accordance with the user's preferences and in a privacy-respecting manner. In particular, implementers would be expected to implement and consistently apply privacy practices that are generally recognized as meeting or exceeding industry or governmental requirements for maintaining the privacy of users. Appropriate uses of gaze information should occur after receiving the consent of the user or another legitimate basis, and users should be given the opportunity to "opt-in" and "opt-out" of gaze-based saliency features. Moreover, gaze data should be managed and handled in a way to minimize risks of unintentional or unauthorized access or use. For example, gaze data may be restricted to systems and sub-systems that are needed to carry out saliency-related features. Data de-identification can also be used to enhance privacy, by removing identifiers, controlling the amount or specificity of data stored, so forth.

Figure 1B:
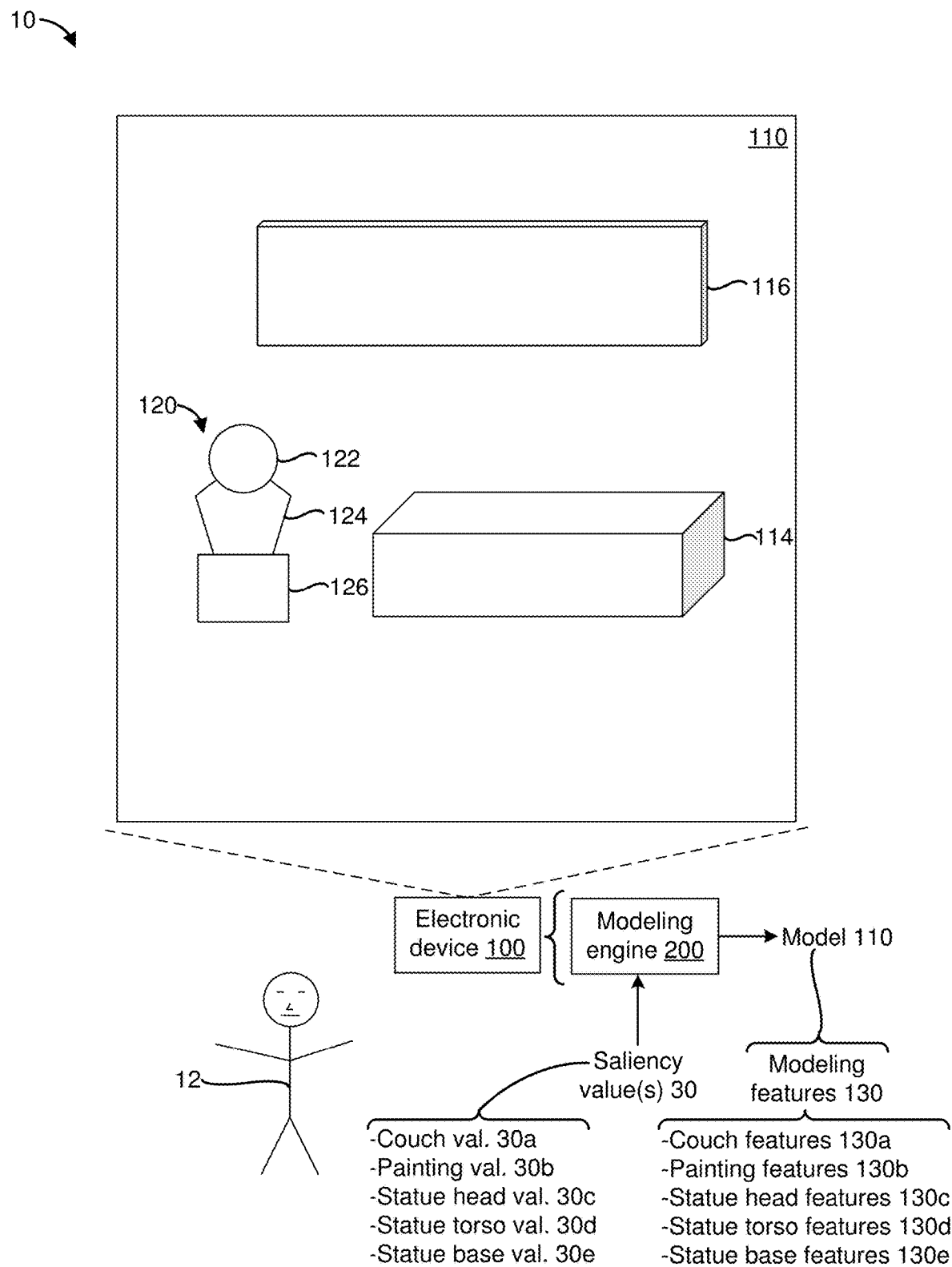

Referring to FIG. 1B, in some implementations, the model 110 includes a model 114 of the couch 14 (hereafter "model couch 114"), a model 116 of the painting 16 (hereafter "model painting 116"), and a model 120 of the statue 20 (hereafter "model statue 120"). As shown in FIG. 1B, the model statue 120 includes a model 122 of the head 22 (hereafter "model head 122"), a model 124 of the torso 24 (hereafter "model torso 124"), and a model 126 of the base 26 (hereafter "model base").

In various implementations, the model 110 includes one or more sets of modeling features 130 (hereafter "modeling features 130") that the modeling engine 200 determines (e.g., selects or generates) based on the saliency values 30. For example, as shown in FIG. 1B, the model 110 includes a set of one or more couch modeling features 130a (hereafter "couch modeling features 130a") that is based on the couch saliency value 30a, a set of one or more painting modeling features 130b (hereafter "painting modeling features 130b") that is based on the painting saliency value 30b, a set of one or more statue head modeling features 130c (hereafter "statue head modeling features 130c") that is based on the statue head saliency value 30c, a set of one or more statue torso modeling features 130d (hereafter "statue torso modeling features 130d") that is based on the statue torso saliency value 30d, and a set of one or more statue base modeling features 130e (hereafter "statue base modeling features 130e") that is based on the statue base saliency value 30e.

In some implementations, the model 110 includes a graphical environment (e.g., an XR environment) that represents the physical environment 10 shown in FIG. 1A. In such implementations, the model couch 114 includes an object (e.g., a graphical object, for example, an XR object) that represents the couch 14, the model painting 116 includes an object that represents the painting 16, the model head 122 includes an object that represents the head 22, the model torso 124 includes an object that represents the torso 24, and the model base 126 includes an object that represents the base 26.

In some implementations, the modeling features 130 define respective pixel densities for various portions of the model 110 based on the corresponding saliency values 30. For example, in some implementations, the couch modeling features 130a define a first pixel density for pixels forming the model couch 114 based on the couch saliency value 30a, the painting modeling features 130b define a second pixel density for pixels forming the model painting 116 based on the painting saliency value 30b, the statue head modeling features 130c define a third pixel density for pixels forming the model head 122 based on the statue head saliency value 30c, the statue torso modeling features 130d define a fourth pixel density for pixels forming the model torso 124 based on the statue torso saliency value 30d, and the statue base modeling features 130e define a fifth pixel density for pixels forming the model base 126 based on the statue base saliency value 30e.

In some implementations, the model 110 includes a three-dimensional (3D) mesh of the physical environment 10 shown in FIG. 1A. In such implementations, the model couch 114 includes a 3D mesh of the couch 14, the model painting 116 includes a 3D mesh of the painting 16, the model head 122 includes a 3D mesh of the head 22, the model torso 124 includes a 3D mesh of the torso 24, and the model base 126 includes a 3D mesh of the base 26. In some implementations, the model 110 includes a two-dimensional (2D) texture map of the physical environment 10 shown in FIG. 1A. For example, in some implementations, the model 110 includes a UV map where the letter 'U' and 'V' denote the axes of the 2D texture.

In some implementations, the modeling features 130 define respective polygon densities for various portions of the model 110 based on the corresponding saliency values 30. For example, in some implementations, the couch modeling features 130a define a first polygon density for polygons mapped to (e.g., collectively forming) the model couch 114 based on the couch saliency value 30a, the painting modeling features 130b define a second polygon density for polygons mapped to the model painting 116 based on the painting saliency value 30b, the statue head modeling features 130c define a third polygon density for polygons mapped to the model head 122 based on the statue head saliency value 30c, the statue torso modeling features 130d define a fourth polygon density for polygons mapped to the model torso 124 based on the statue torso saliency value 30d, and the statue base modeling features 130e define a fifth polygon density for polygons mapped to the model base 126 based on the statue base saliency value 30e.

Figure 1C:
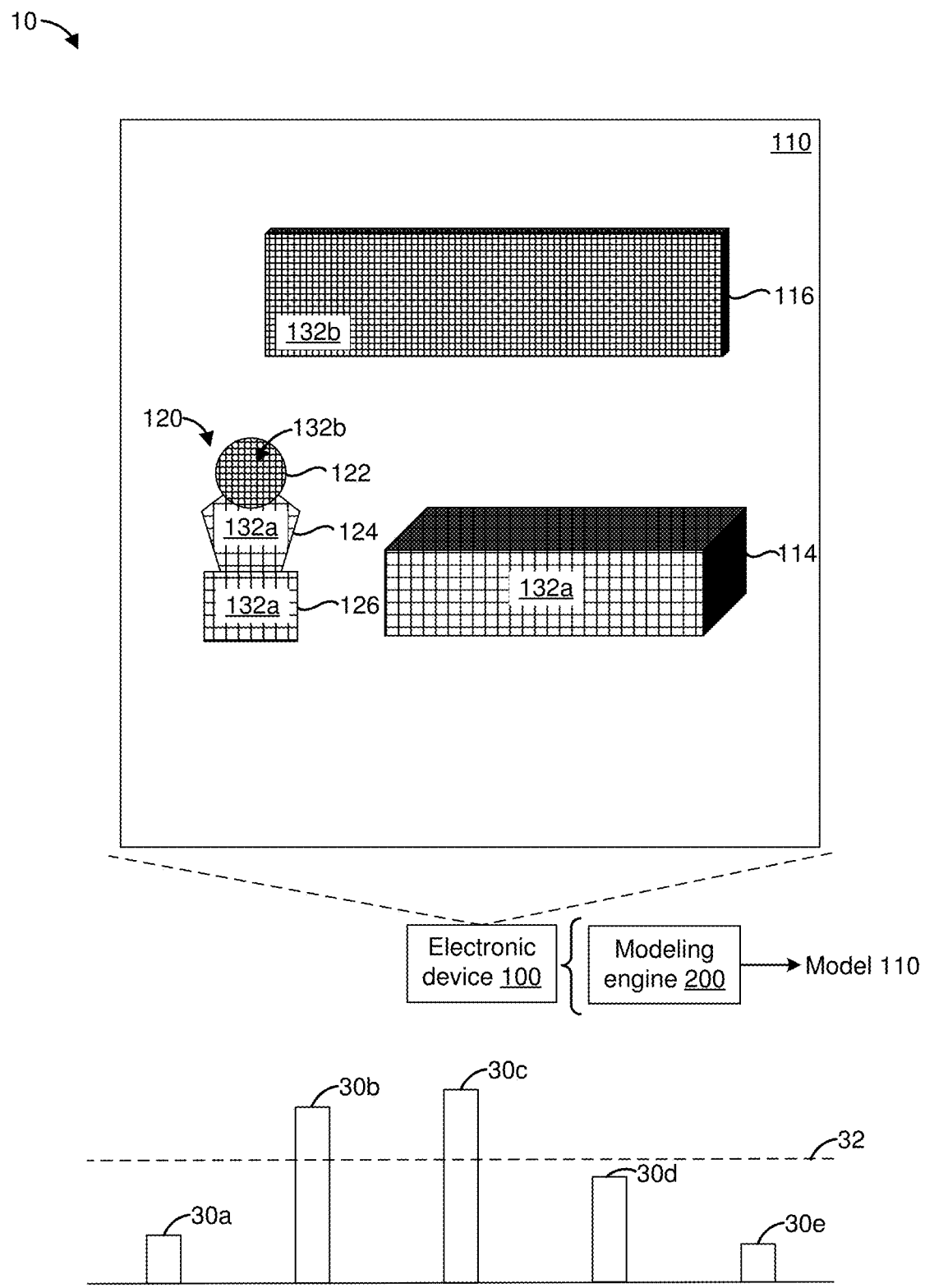

Referring to FIG. 1C, in some implementations, the modeling engine 200 utilizes a first modeling feature density 132a to model physical articles that are associated with respective saliency values 30 that are less than a threshold saliency value 32, and the modeling engine 200 utilizes a second modeling feature density 132b to model physical articles that are associated with respective saliency values 30 that are greater than the threshold saliency value 32. In the example of FIG. 1C, the modeling engine 200 utilizes the first modeling feature density 132a for the model couch 114, the model torso 124 and the model base 126 because the couch saliency value 30a, the statue torso saliency value 30d and the statue base saliency value 30e are less than the threshold saliency value 32. In the example of FIG. 1C, the modeling engine 200 utilizes the second modeling feature density 132b for the model painting 116 and the model head 122 because the painting saliency value 30b and the statue head saliency value 30c are greater than the threshold saliency value 32. More generally, in various implementations, the modeling engine 200 selects the modeling features 130 for a particular portion of the model 110 based on the saliency value 30 associated with that particular portion of the model 110.

In some implementations, the modeling engine 200 selects a modeling feature density for a particular portion of the model 110 such that the modeling feature density is a function of (e.g., proportional to) the saliency value 30 associated with that particular portion of the model 110. In the example of FIG. 1C, the second modeling feature density 132b appears denser than the first modeling feature density 132a because the saliency values 30b and 30c are greater than the saliency values 30a, 30d and 30e. In some implementations, the first modeling feature density 132a includes a first pixel density of pixels in a graphical environment and the second modeling feature density 132b includes a second pixel density of pixels in the graphical environment. In some implementations, the first modeling feature density 132a includes a first polygon density of polygons in a mesh or a texture map, and the second modeling feature density 132b includes a second polygon density of polygons in the mesh or the texture map.

In some implementations, the modeling engine 200 utilizes different sets of modeling features to model different portions of an object based on the saliency values 30 associated with the portions. For example, as shown in FIG. 1C, the modeling engine 200 uses the first modeling feature density 132a for the model torso 124 and the model base 126, and the second modeling feature density 132b for the model head 122. As a result, in some implementations, the model head 122 is rendered with a higher pixel density than the model torso 124 and the model base 126.

Figure 1D:
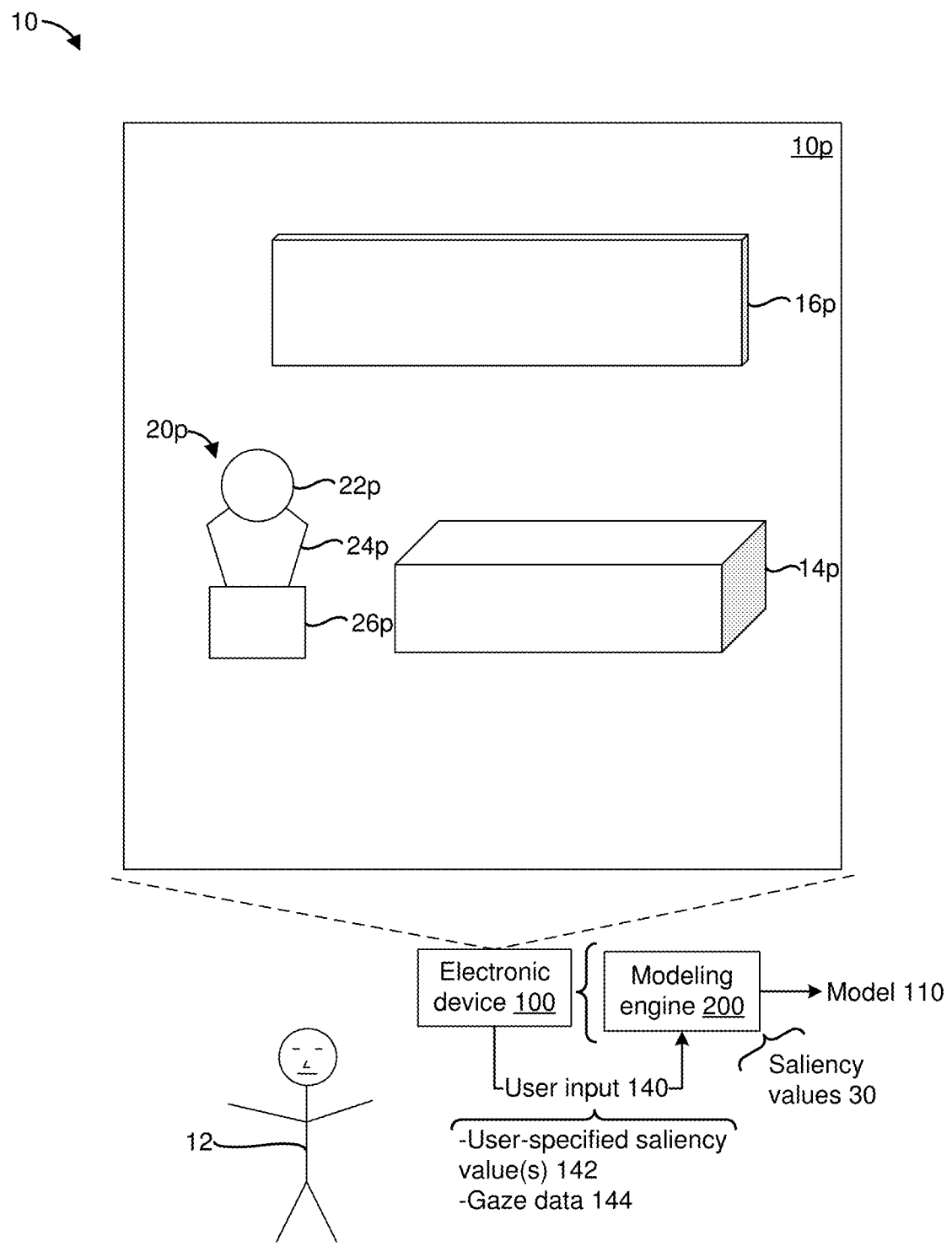

Referring to FIG. 1D, in some implementations, the electronic device 100 includes a pass-through display that presents a pass-through representation 10p of the physical environment 10 shown in FIG. 1A. In some implementations, the electronic device 100 includes an optical see-through display and the pass-through representation 10p includes an optical pass-through of the physical environment 10. In some implementations, the electronic device 100 includes an opaque display and the pass-through representation 10p includes a video pass-through of the physical environment 10. As illustrated in FIG. 1D, the pass-through representation 10p of the physical environment 10 includes a pass-through representation 14p of the couch 14, a pass-through representation 16p of the painting 16, a pass-through representation 20p of the statue 20, a pass-through representation 22p of the head 22, a pass-through representation 24p of the torso 24, and a pass-through representation 26p of the base 26.

In some implementations, the electronic device 100 detects a user input 140 that is provided by the user 12, and the modeling engine 200 determines the saliency values 30 based on the user input 140. In some implementations, the user input 140 includes user-specified saliency values 142, and the modeling engine 200 determines the saliency values 30 based on the user-specified saliency values 142. For example, in some implementations, the saliency values 30 are the same as the user-specified saliency values 142. In some implementations, the modeling engine 200 sets the saliency values 30 such that the saliency values 30 are within a similarity threshold of the user-specified saliency values 142.

In some implementations, with appropriate user understanding, the electronic device 100 obtains gaze data 144, and the modeling engine 200 determines the saliency values 30 based on the gaze data 144. In some implementations, the gaze data 144 indicates which physical articles the user 12 is gazing at. In some implementations, the gaze data 144 indicates gaze durations for various locations within the physical environment 10. In some implementations, the saliency values 30 are a function of (e.g., proportional to) the gaze durations. For example, in some implementations, the painting saliency value 30b is greater than the couch saliency value 30a because the gaze data 144 indicates that the user 12 gazed at the painting 16 for a longer time duration than the couch 14.

Figure 1E:
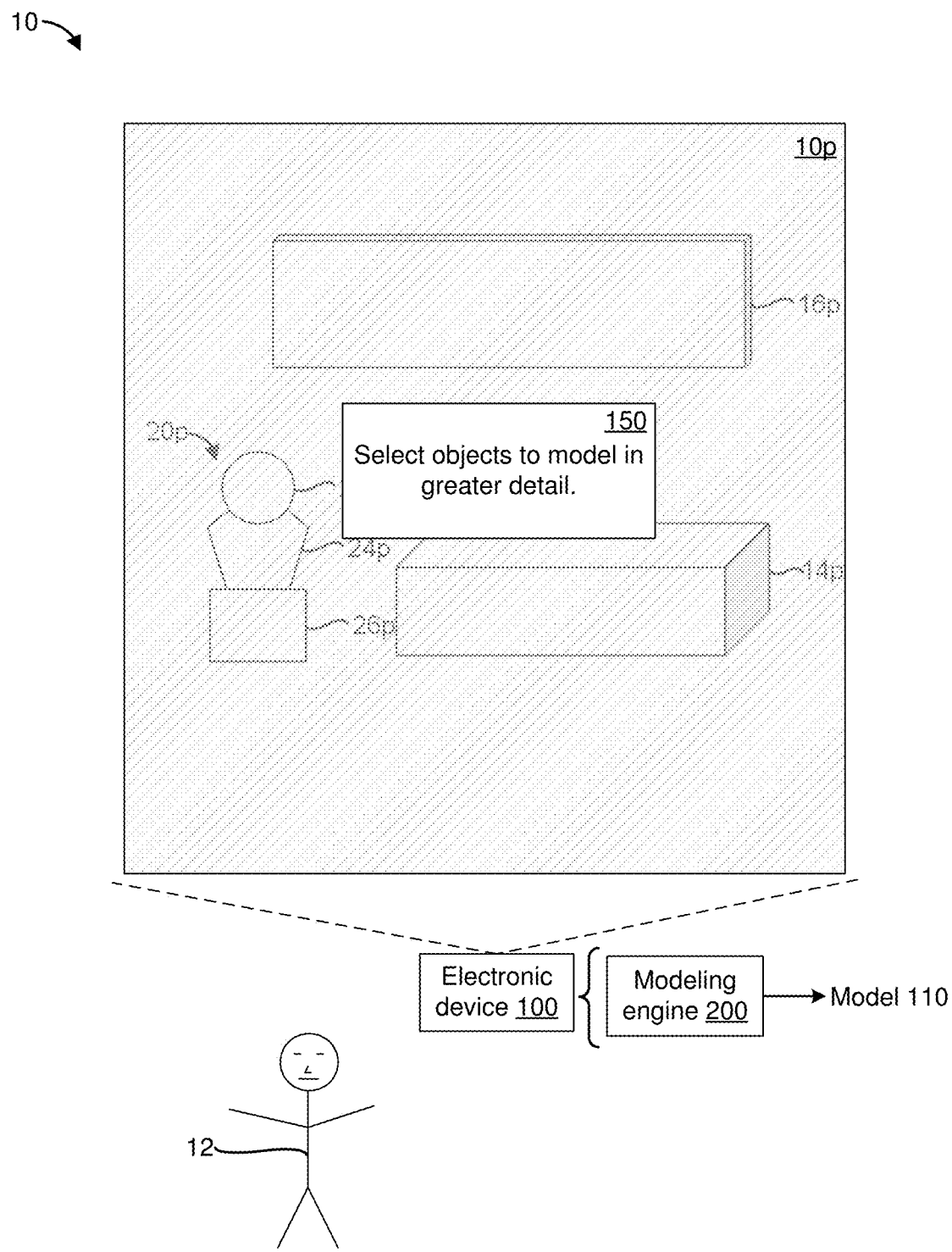
Figure 1F:
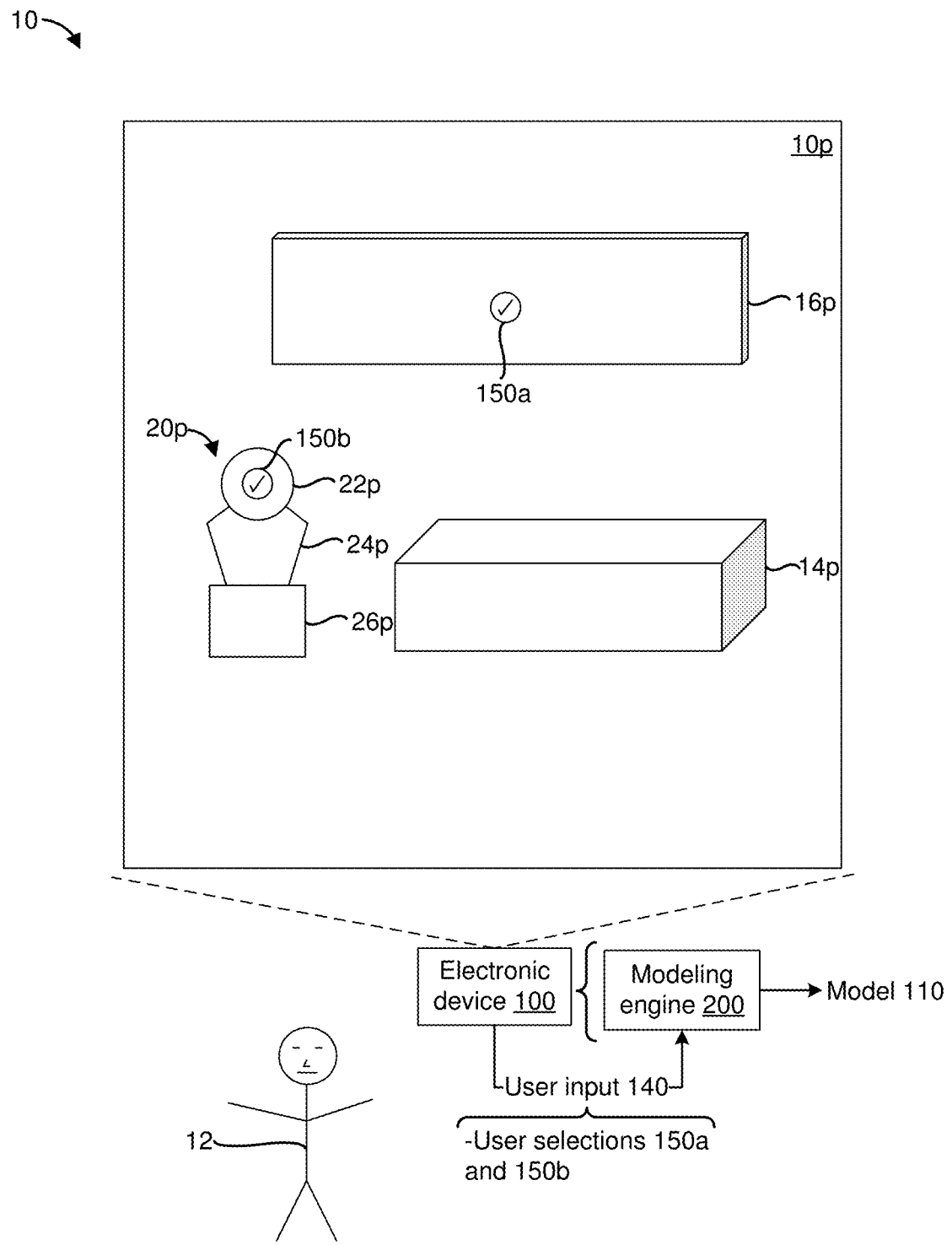

Referring to FIGS. 1E and 1F, in some implementations, the electronic device 100 requests the user 12 to specify which physical articles are of most interest to the user 12. As shown in FIG. 1E, in some implementations, the electronic device 100 displays a prompt 150 that requests the user 12 to select objects that are to be modeled in greater detail (e.g., with a greater number of modeling features 130 shown in FIG. 1B). As shown in FIG. 1F, in some implementations, the user input 140 indicates a first user selection 150a that corresponds to the painting 16 and a second user selection 150b that corresponds to the head 22 of the statue 20. In some implementations, in response to detecting the first user selection 150a and the second user selection 150b, the modeling engine 200 determines that the painting 16 and the head 22 of the statue 20 are to be modeled in greater detail. As such, in some implementations, as shown in FIG. 1C, the modeling engine 200 uses the higher second modeling feature density 132b for the model painting 116 and the model head 122 (e.g., instead of the lower first modeling feature density 132a).

Figure 1G:
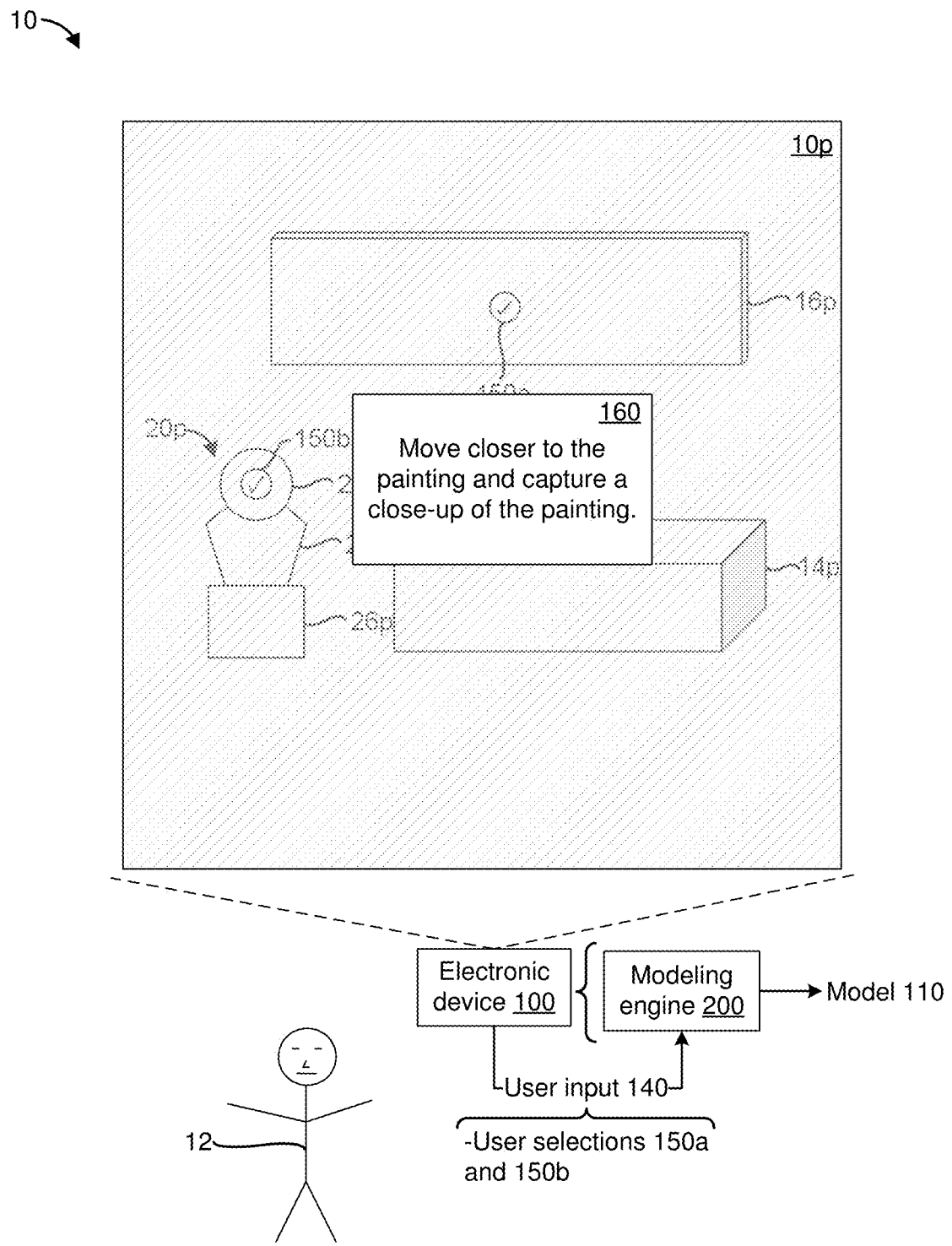
Figure 1H:
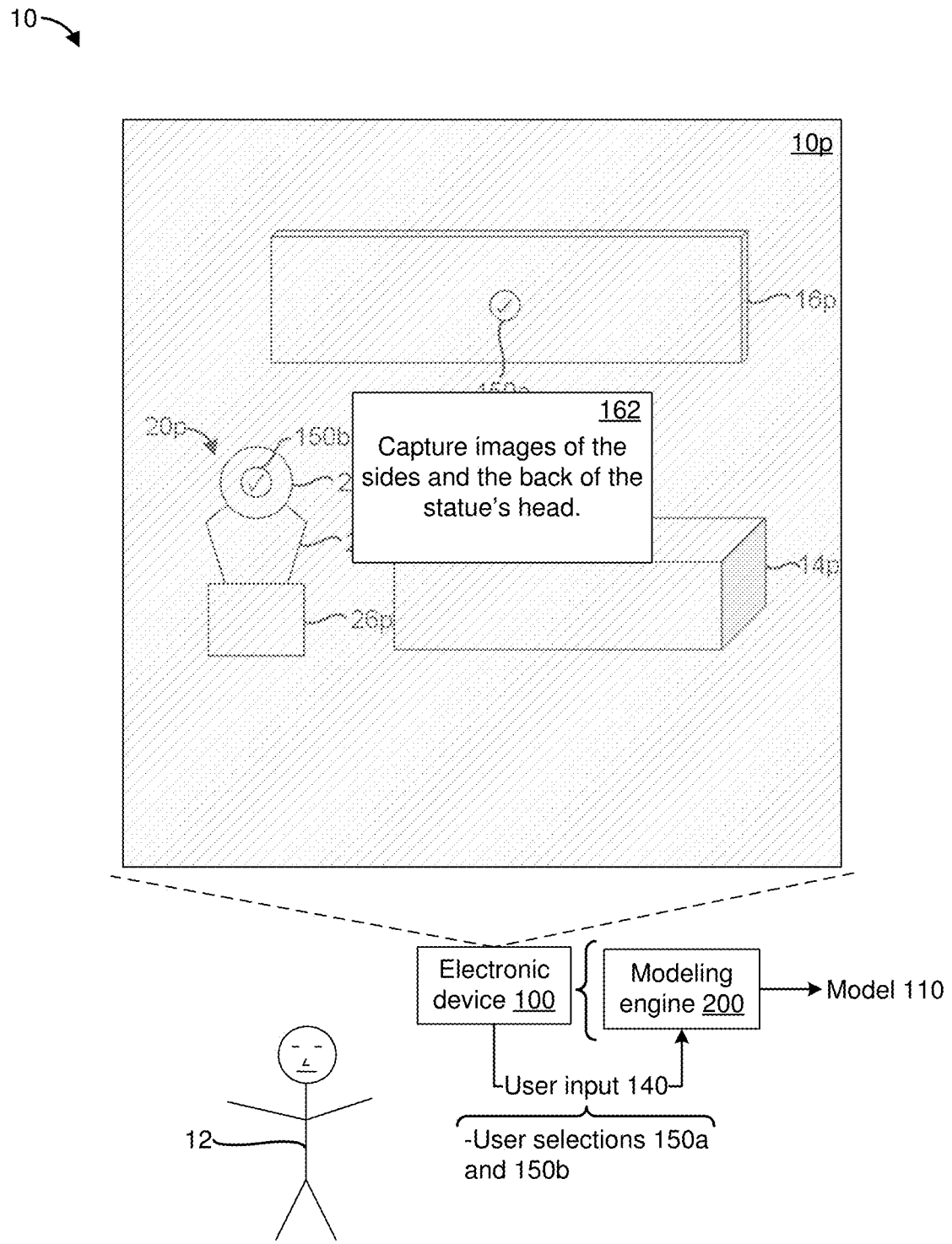

Referring to FIGS. 1G and 1H, in some implementations, the electronic device 100 prompts the user 12 to capture additional environmental data for physical articles that are to be modeled in greater detail. For example, as shown in FIG. 1G, the electronic device 100 displays a notification 160 that requests the user 12 to move the electronic device 100 closer to the painting 16 and capture a close-up image of the painting 16. As another example, as shown in FIG. 1H, in some implementations, the electronic device 100 displays a notification 162 that requests the user 12 to capture images of the sides and the back of the head 22 of the statue 20 (e.g., so that the modeling engine 200 can generate a suitable 3D model of the head 22). More generally, in some implementations, the electronic device 100 prompts the user 12 to capture additional environmental data (e.g., additional images) for a physical article associated with a saliency value that is greater than a threshold saliency value. In various implementations, the additional environmental data allows the modeling engine 200 to model the physical article with a greater number of modeling features. For example, the additional environmental data allows the modeling engine 200 to represent the physical article with a greater number of pixels in a graphical environment, and/or a greater number of polygons in a 3D mesh, a 2D texture map and/or a 2D UV map.

Figure 1I:
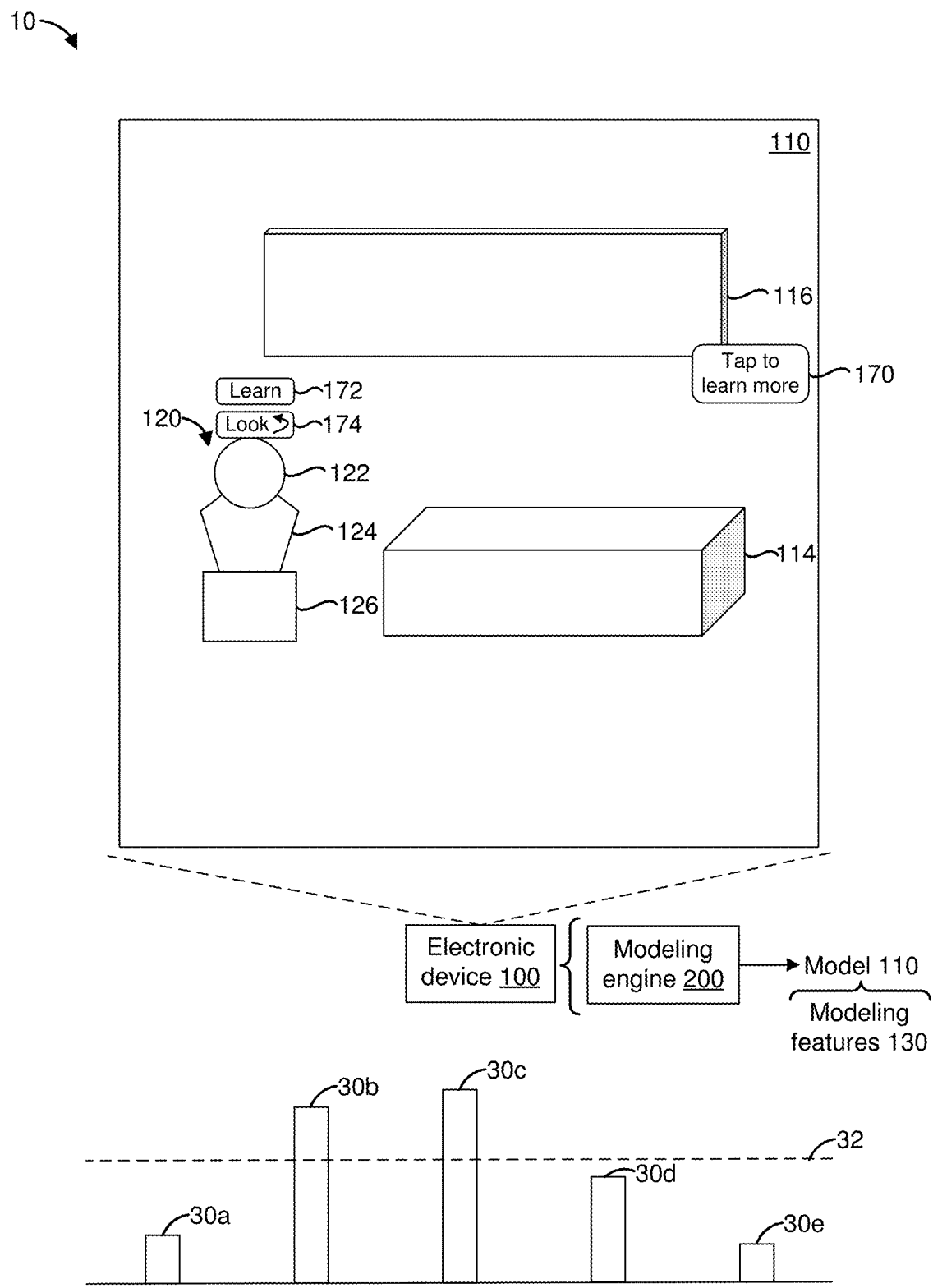
Figure 1J:
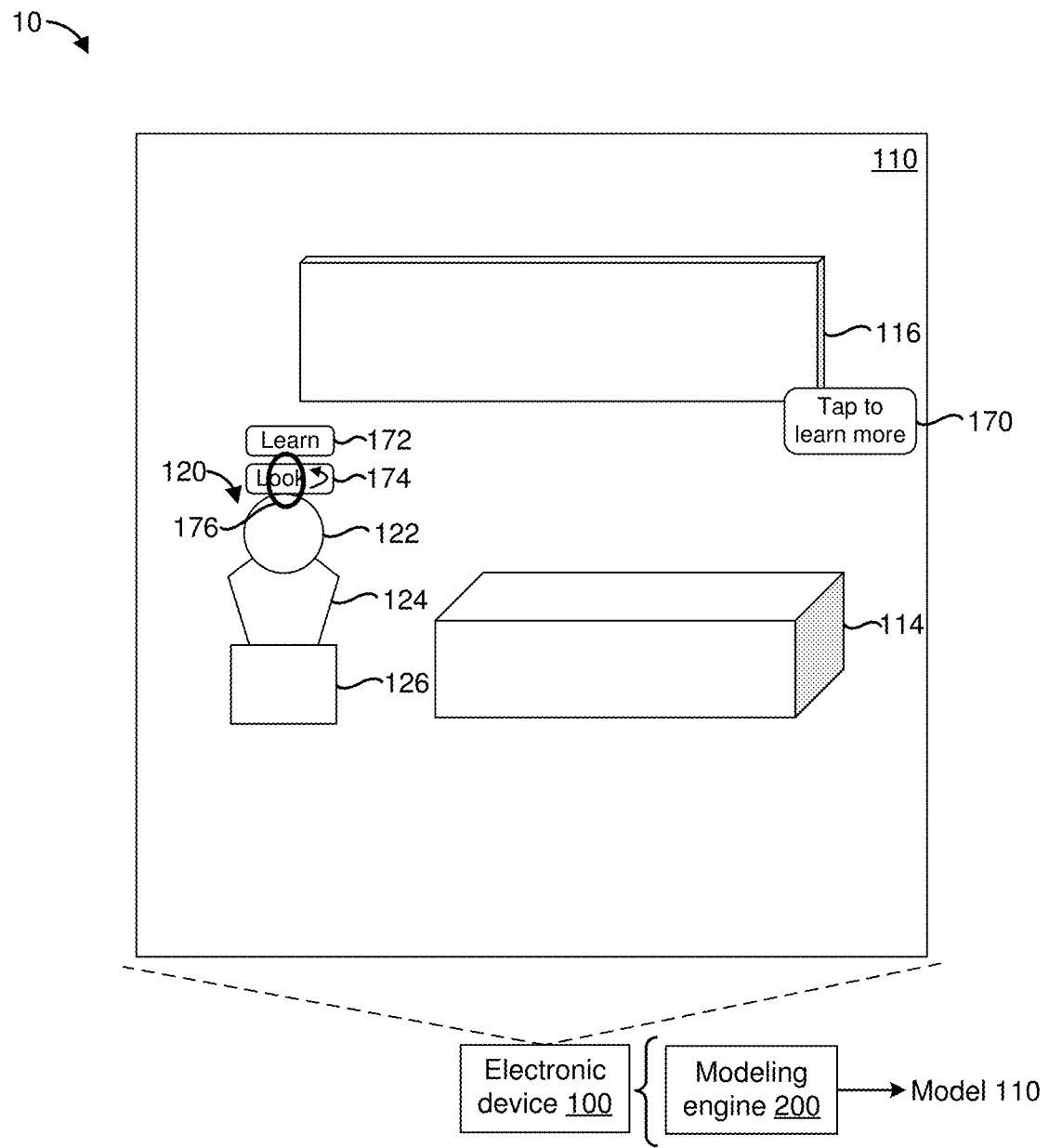
Figure 1K:
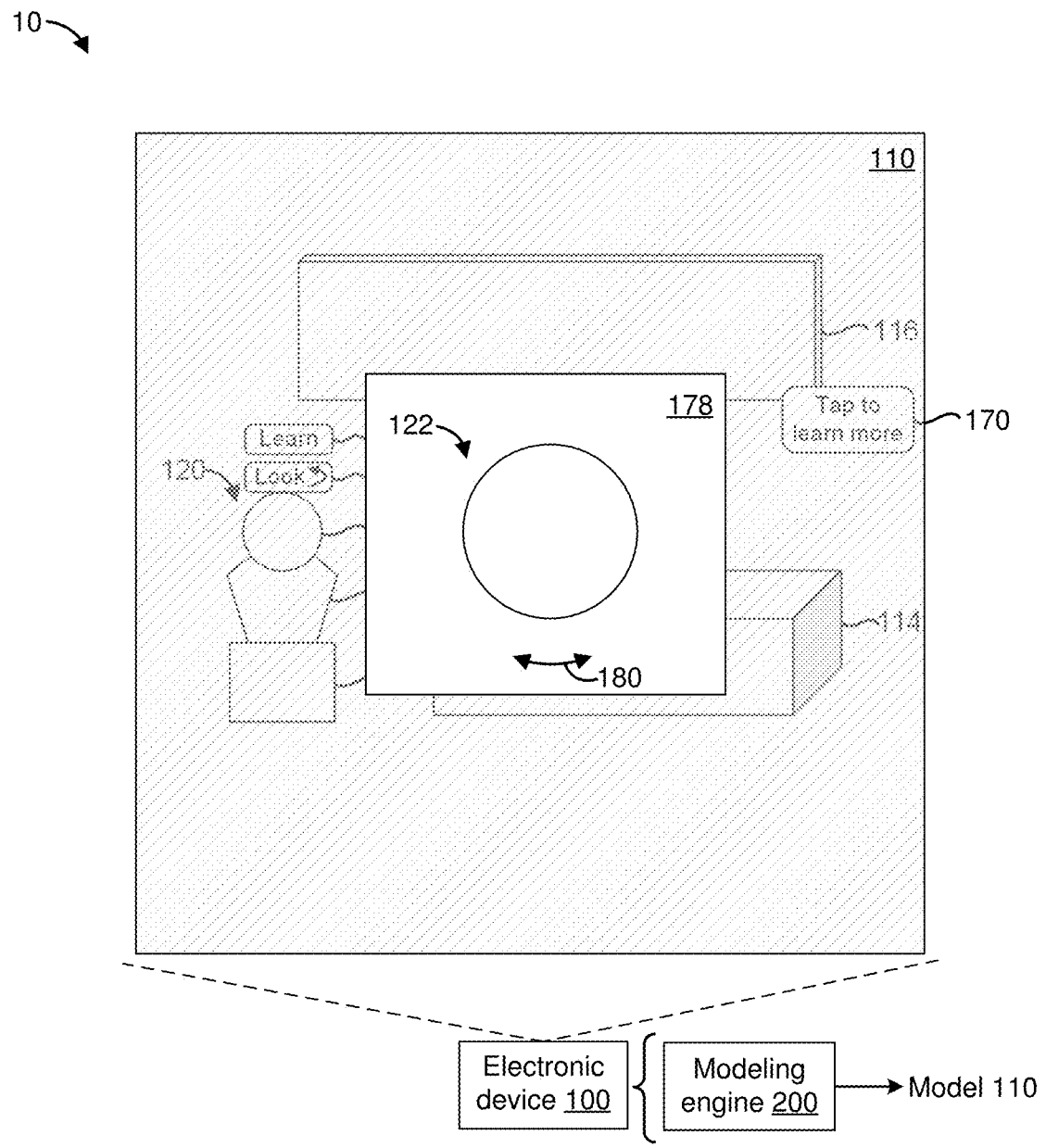

Referring to FIGS. 1I-1K, in some implementations, the modeling features 130 include affordances that the user 12 can select to perform respective user interface operations. In some implementations, the modeling engine 200 composites affordances in association with portions of the model 110 that are associated with saliency values 30 that are greater than the threshold saliency value 32. In the example of FIG. 1I, the modeling engine 200 composites a painting affordance 170 in association with the model painting 116, for example, because the painting saliency value 30b is greater than the threshold saliency value 32. In some implementations, a user selection of the painting affordance 170 triggers the electronic device 100 to present information regarding the painting 16 (e.g., to display a name of an artist that made the painting 16, when the painting 16 was made, etc.). As shown in FIG. 1I, the modeling engine 200 composites a learn affordance 172 and a look-around affordance 174 in association with the model head 122. In some implementations, a user selection of the learn affordance 172 triggers the electronic device 100 to present information regarding the statue 20 (e.g., to display a name of a sculptor that made the statue 20, a time indicative of when the statue 20 was made, etc.). In some implementations, a user selection of the look-around affordance 174 triggers the electronic device 100 to display a 3D view of the head 22 that allows the user 12 to look around the head 22 of the statue 20 (e.g., view the model head 122 from different points of view).

In some implementations, a number of affordances that the modeling engine 200 composites in association with a model of a physical article is based on the saliency value of the physical article. In the example of FIG. 1I, the modeling engine 200 does not composite affordances in association with the model couch 114, the model torso 124 and the model base 126 because the couch saliency value 30a, the statue torso saliency value 30d and the statue base saliency value 30e are lower than the threshold saliency value 32. In some implementations, the number of affordances that the modeling engine 200 composites in association with a model of a physical article is a function of (e.g., proportional to) the saliency value 30 of the physical article. In the example of FIG. 1I, the modeling engine 200 composites more affordances in association with the model head 122 than the model painting 116, for example, because the statue head saliency value 30c is greater than the painting saliency value 30b.

FIG. 1J illustrates a user input 176 (e.g., a tap) at a location corresponding to the look-around affordance 174. In some implementations, the user input 176 corresponds to a request to view the model head 122 from various different angles (e.g., from different point-of-views (POVs)). For example, in some implementations, the user input 176 corresponds to a request to display a 360° view of the model head 122.

Referring to FIG. 1K, in some implementations, in response to detecting the user input 176 shown in FIG. 1J, the electronic device 100 presents an expanded view 178 of the model head 122. In some implementations, the expanded view 178 includes a rotate affordance 180 that, when selected, rotates the model head 122 so that the user 12 can view the model head 122 from different angles (e.g., so that the user 12 can view a side or a back of the model head 122).

In some implementations, the electronic device 100 includes or is attached to a head-mountable device (HMD) worn by the user 12. The HMD presents (e.g., displays) an XR environment (e.g., the pass-through representation 10p shown in FIG. 1D) according to various implementations. In some implementations, the HMD includes an integrated display (e.g., a built-in display) that displays the XR environment. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the XR environment. In various implementations, examples of the electronic device 100 include smartphones, tablets, media players, laptops, etc.

Figure 2:
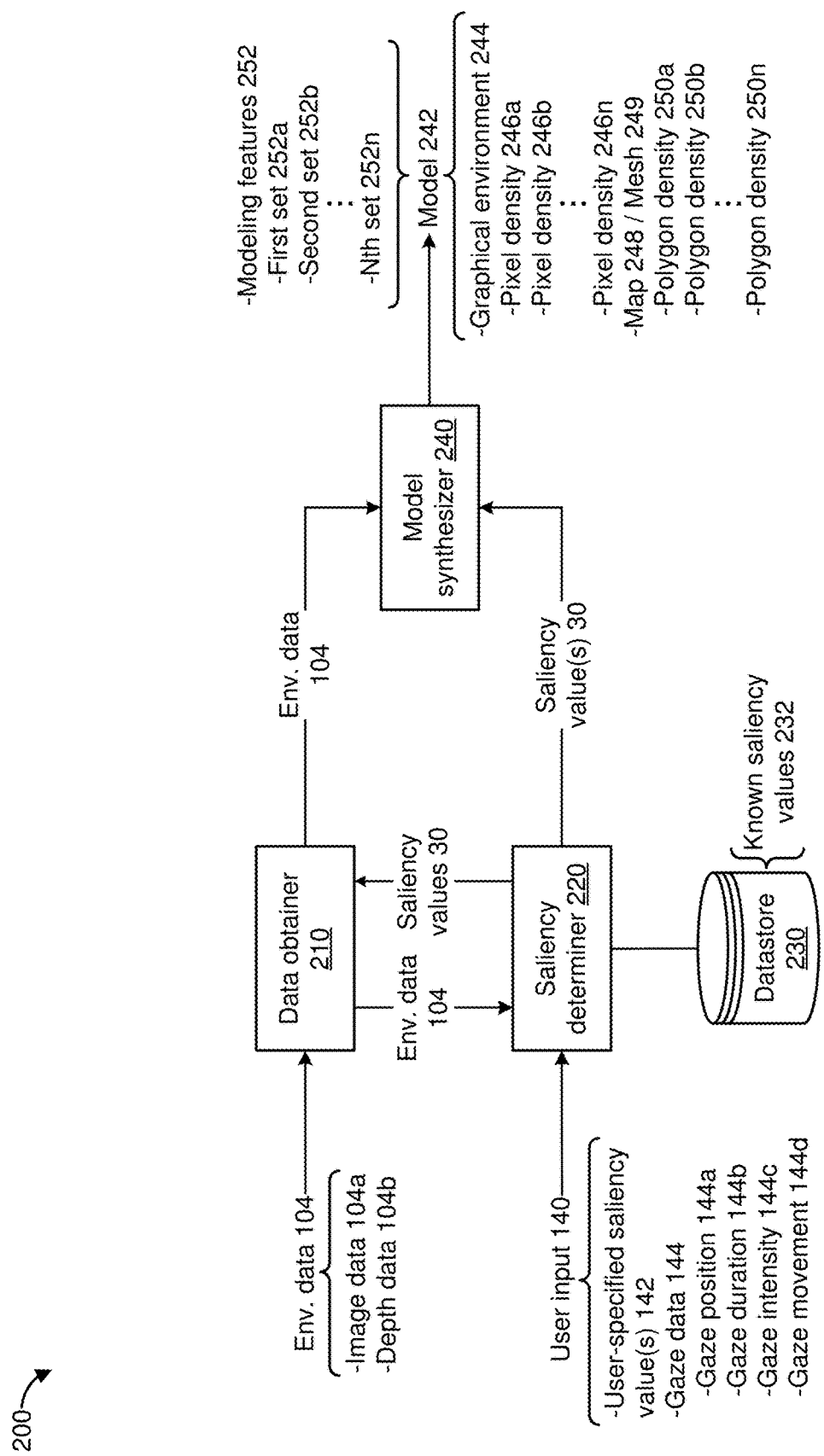
FIG. 2 is a block diagram of a modeling engine in accordance with some implementations.

FIG. 2 illustrates a block diagram of the modeling engine 200 in accordance with some implementations. In some implementations, the modeling engine 200 includes a data obtainer 210, a saliency determiner 220, a datastore 230 and a model synthesizer 240.

In various implementations, the data obtainer 210 obtains the environmental data 104. In some implementations, the data obtainer 210 receives the environmental data 104 from an environmental sensor (e.g., the sensor 102 shown in FIG. 1A). In some implementations, the environmental data 104 includes image data 104a. In some implementations, the image data 104a includes a set of one or more images that are captured by an image sensor (e.g., a camera). In some implementations, the environmental data 104 includes depth data 104b that is captured by a depth sensor (e.g., a depth camera). In some implementations, the data obtainer 210 obtains a request (e.g., a user request, for example, from the user 12 shown in FIG. 1A) to synthesize a model of a physical environment, and the data obtainer 210 obtains the environmental data 104 in response to obtaining the request to synthesize the model. In various implementations, the data obtainer 210 provides the environmental data 104 to the saliency determiner 220 and/or the model synthesizer 240.

In various implementations, the saliency determiner 220 determines the saliency values 30 for at least some portions of the physical environment indicated by the environmental data 104. For example, in some implementations, the saliency determiner 220 determines the saliency values 30 for at least some objects (e.g., physical articles) represented by pixels in the image data 104a. In some implementations, the saliency determiner 220 determines the saliency values based on the environmental data 104. For example, in some implementations, the saliency determiner 220 performs instance segmentation and/or semantic segmentation on the environmental data 104 in order to identify objects represented by the environmental data 104. In some such implementations, the saliency determiner 220 estimates respective user interest levels in the objects based on a user's historical interactions with various objects. In some implementations, the saliency values 30 for the objects represented by the environmental data 104 are a function of estimated user interest levels in the objects.

As described in relation to FIG. 1D, in some implementations, the saliency determiner 220 determines the saliency values 30 based on the user input 140. In some implementations, the saliency determiner 220 determines the saliency values 30 based on the user-specified saliency values 142. In some implementations, the saliency values 30 are the same as the user-specified saliency values 142. In some implementations, the saliency values 30 are similar to (e.g., within a similarity threshold of) the user-specified saliency values 142.

As described in relation to FIG. 1D, in some implementations, with appropriate user understanding, the saliency determiner 220 determines the saliency values 30 based on the gaze data 144. In some implementations, the gaze data 144 indicates a gaze position 144a (e.g., pixel coordinates within the pass-through representation 10p shown in FIG. 1D), a gaze duration 144b (e.g., an amount of time for which the gaze is focused on the gaze position 144a), a gaze intensity 144c (e.g., a dimension of the gaze, for example, a number of pixels that the gaze is directed to), and/or a gaze movement 144d (e.g., a direction in which the gaze is moving). In some implementations, the saliency determiner 220 determines the saliency values 30 based on a combination of the gaze position 144a, the gaze duration 144b, the gaze intensity 144c and/or the gaze movement 144d. In some implementations, the saliency determiner 220 determines the saliency values 30 such that the saliency values 30 are a function of (e.g., proportional to) the gaze duration 144b. For example, if the gaze duration 144b indicates that the user 12 gazed at the painting 16 for a longer time duration than the couch 14, the saliency determiner 220 generates the saliency values 30 such that the painting saliency value 30b is greater than the couch saliency value 30a.

In some implementations, the saliency determiner 220 generates the saliency values based on known saliency values 232 stored in the datastore 230. In some implementations, the saliency determiner 220 compares the objects represented by the environmental data 104 with objects associated with the known saliency values 232. In some implementations, the saliency determiner 220 sets the saliency values 30 of objects represented by the environmental data 104 to known saliency values 232 of objects that are similar to the objects represented by the environmental data 104. For example, in some implementations, the saliency determiner 220 sets the painting saliency value 30b to a known saliency value 232 for a wall hanging because the painting 16 is a type of wall hanging.

In some implementations, the saliency determiner 220 provides the saliency values to the data obtainer 210. In some implementations, the data obtainer 210 obtains additional environmental data for objects (e.g., physical articles) that are associated with saliency values 30 that are greater than a threshold saliency value (e.g., the threshold saliency value 32 shown in FIG. 1C). In some implementations, the data obtainer 210 displays a notification that prompts the user 12 to capture additional environmental data for an object with a saliency value 30 that is greater than the threshold saliency value. For example, in some implementations, the data obtainer 210 displays a notification that prompts the user 12 to move closer to an object so that the sensor can capture additional environmental data (e.g., additional image data and/or additional depth data) related to the object (e.g., the data obtainer 210 displays the notification 160 shown in FIG. 1G). For example, in some implementations, the data obtainer 210 displays a notification that prompts the user 12 to capture additional images of the object (e.g., the data obtainer 210 displays the notification 162 shown in FIG. 1H).

In various implementations, the model synthesizer 240 synthesizes (e.g., generates) a model 242 (e.g., the model 110 shown in FIGS. 1A-1K) based on the environmental data 104 and the saliency values 30. In some implementations, the model 242 includes a graphical environment 244 (e.g., an XR environment) that includes various pixels. In some implementations, different portions of the graphical environment 244 utilize different pixel densities based on their respective saliency values 30. For example, in some implementations, a first portion of the graphical environment 244 utilizes a first pixel density 246a based on the first portion of the graphical environment 244 representing a first portion of a physical environment that is associated with a first one of the saliency values 30. Similarly, in some implementations, a second portion of the graphical environment 244 utilizes a second pixel density 246b based on the second portion of the graphical environment 244 representing a second portion of the physical environment that is associated with a second one of the saliency values 30. Similarly, in some implementations, an nth portion of the graphical environment 244 utilizes an nth pixel density 246n based on the nth portion of the graphical environment 244 representing an nth portion of the physical environment that is associated with an nth one of the saliency values 30. In some implementations, the pixel densities 246a, 246b, . . . , and 246n are a function of (e.g., proportional to) their associated saliency values 30. For example, the first pixel density 246a may be greater than the second pixel density 246b if the first one of the saliency values 30 associated with the first pixel density 246a is greater than the second one of the saliency values 30 associated with the second pixel density 246b.

In some implementations, the model 242 includes a map 248 (e.g., a texture map and/or a UV map) and/or a mesh 249 (e.g., a 3D mesh) that includes various polygons. In some implementations, different portions of the map 248 and/or the mesh 249 utilize different polygon densities based on their respective saliency values 30. For example, in some implementations, a first portion of the map 248 and/or the mesh 249 utilizes a first polygon density 250a based on the first portion of the map 248 and/or the mesh 249 representing a first portion of a physical environment that is associated with a first one of the saliency values 30. Similarly, in some implementations, a second portion of the map 248 and/or the mesh 249 utilizes a second polygon density 250b based on the second portion of the map 248 and/or the mesh 249 representing a second portion of the physical environment that is associated with a second one of the saliency values 30. Similarly, in some implementations, an nth portion of the map 248 and/or the mesh 249 utilizes an nth polygon density 250n based on the nth portion of the map 248 and/or the mesh 249 representing an nth portion of the physical environment that is associated with an nth one of the saliency values 30. In some implementations, the polygon densities 250a, 250b, . . . , and 250n are a function of (e.g., proportional to) their associated saliency values 30. For example, the first polygon density 250a may be greater than the second polygon density 250b if the first one of the saliency values 30 associated with the first polygon density 250a is greater than the second one of the saliency values 30 associated with the second polygon density 250b.

In various implementations, the model 242 includes various modeling features 252. In some implementations, the modeling features 252 include pixels with the pixel densities 246a, 246b, . . . , and 246n. In some implementations, the modeling features 252 include polygons with the polygon densities 250a, 250b, . . . , 250n. In some implementations, different portions of the model 242 utilize different sets of modeling features 252 based on their respective saliency values 30. For example, in some implementations, a first portion of the model 242 utilizes a first set of modeling features 252a (e.g., the first pixel density 246a and/or the first polygon density 250a) based on the first portion of the model 242 representing a first portion of a physical environment that is associated with a first one of the saliency values 30. Similarly, in some implementations, a second portion of the model 242 utilizes a second set of modeling features 252b (e.g., the second pixel density 246b and/or the second polygon density 250b) based on the second portion of the model 242 representing a second portion of the physical environment that is associated with a second one of the saliency values 30. Similarly, in some implementations, an nth portion of the model 242 utilizes an nth set of modeling features 252n (e.g., the nth pixel density 246n and/or the nth polygon density 250n) based on the nth portion of the model 242 representing an nth portion of the physical environment that is associated with an nth one of the saliency values 30.

In some implementations, a number of the modeling features in the sets of modeling features 252a, 252b, . . . , and 252n is a function of (e.g., proportional to) their associated saliency values 30. For example, a first number of modeling features in the first set of modeling features 252a may be greater than a second number of modeling features in the second set of modeling features 252b if the first one of the saliency values 30 associated with the first set of modeling features 252a is greater than the second one of the saliency values 30 associated with the second set of modeling features 252b. As an example, a first number of pixels in the first portion of the model 242 may be greater than a second number of pixels in the second portion of the model 242 in response to the first one of the saliency values 30 associated with the first portion of the model 242 being greater than the second one of the saliency values 30 associated with the second portion of the model 242. As another example, a first number of polygons in the first portion of the model 242 may be greater than a second number of polygons in the second portion of the model 242 in response to the first one of the saliency values 30 associated with the first portion of the model 242 being greater than the second one of the saliency values 30 associated with the second portion of the model 242.

FIG. 3 is a flowchart representation of a method 300 for modeling a physical environment. In various implementations, the method 300 is performed by a device (e.g., the electronic device 100 shown in FIGS. 1A-1K, and/or the modeling engine 200 shown in FIGS. 1A-2). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes determining that a first portion of a physical environment is associated with a first saliency value and a second portion of the physical environment is associated with a second saliency value that is different from the first saliency value. For example, as shown in FIG. 1A, the couch 14 is associated with a couch saliency value 30a and the painting 16 is associated with a painting saliency value 30b. As shown in FIG. 1C, the couch saliency value 30a is different from (e.g., less than) the painting saliency value 30b.

As represented by block 310a, in some implementations, the device further includes an input device, and determining the first saliency value and the second saliency value includes detecting, via the input device, a set of one or more user inputs specifying the first saliency value and the second saliency value. For example, as shown in FIG. 1D, in some implementations, the electronic device 100 detects a user input 140 that includes the user-specified saliency values 142.

As represented by block 310b, in some implementations, the first portion of the physical environment corresponds to a first physical article in the physical environment and the second portion of the physical environment corresponds to a second physical article in the physical environment. For example, as shown in FIG. 1A, the couch saliency value 30a corresponds to the couch 14 and the painting saliency value 30b corresponds to the painting 16 that is a distinct physical article from the couch 14.

In some implementations, the first portion of the physical environment corresponds to a first portion of a physical article in the physical environment and the second portion of the physical environment corresponds to a second portion of the physical article. For example, as shown in FIG. 1A, the statue head saliency value 30c corresponds to the head 22 of the statue 20 and the statue torso saliency value 30d corresponds to the torso 24 that is a part of the statue 20. As such, in the example of FIG. 1A, the statue head saliency value 30c, the statue torso saliency value 30d and the statue base saliency value 30e correspond to different portions of the same physical article.

As represented by block 310c, in some implementations, determining the first saliency value and the second saliency value includes determining the first saliency value based on a first known saliency value of a first object that is within a similarity threshold of the first portion of the physical environment, and determining the second saliency value based on a second known saliency value of a second object that is within a similarity threshold of the second portion of the physical environment. For example, as described in relation to FIG. 2, in some implementations, the saliency determiner 220 determines the saliency values 30 for physical articles in the physical environment 10 based on known saliency values 232 of physical articles that are similar to the physical articles in the physical environment 10.

As represented by block 310d, in some implementations, determining the first saliency value and the second saliency value includes obtaining a request to generate a model of the physical environment, and determining the first saliency value and the second saliency value in response to obtaining the request to generate the model. In some implementations, the method 300 includes detecting a user input that corresponds to the request to generate the model. For example, in some implementations, the method 300 includes obtaining a request to scan the physical environment.

As represented by block 310e, in some implementations, determining the first saliency value and the second saliency value includes obtaining, via the one or more sensors, gaze data indicating a first amount of time that a person (e.g., a user of the device) gazed at the first portion of the physical environment and a second amount of time that the person (e.g., the user of the device) gazed at the second portion of the physical environment. In some implementations, the method 300 includes determining the first saliency value based on the first amount of time and the second saliency value based on the second amount of time. For example, as shown in FIGS. 1D and 2, in some implementations, the modeling engine 200 (e.g., the saliency determiner 220) determines the saliency values 30 based on the gaze data 144. In some implementations, the gaze data relates to a user of the device. In some implementations, the gaze data relates to another person (e.g., a group of other persons). For example, in some implementations, the gaze data indicates which physical articles do people generally gaze at the most. As another example, in some implementations, the gaze data indicates which portions of a physical article people generally gaze at the most. In some implementations, the first saliency value is a function of (e.g., proportional to) the first amount of time and the second saliency value is a function of (e.g., proportional to) the second amount of time. In some implementations, the first saliency value is greater than the second saliency value in response to the first amount of time being greater than the second amount of time. As discussed above, it should be understood that the use of gaze information to enhance saliency-based content delivery should be managed and handled to minimize risks of inappropriate access or use of gaze information, and the nature of authorized use should be clearly indicated to users.

As represented by block 310f, in some implementations, the first saliency value indicates a first estimated amount of interest of a user of the device in the first portion of the physical environment and the second saliency value indicates a second estimated amount of interest of the user in the second portion of the physical environment.

As represented by block 320, in some implementations, the method 300 includes obtaining, via the one or more sensors, environmental data corresponding to the physical environment. For example, as shown in FIGS. 1A and 2, in some implementations, the modeling engine 200 (e.g., the data obtainer 210) obtains the environmental data 104. In some implementations, the method 300 includes receiving the environmental data from an environmental sensor. In some implementations, the method 300 includes triggering the environmental sensor to capture the environmental data.

As represented by block 320a, in some implementations, the one or more sensors include an image sensor (e.g., a camera) and the environment data includes a set of one or more images of the physical environment. For example, as shown in FIG. 2, in some implementations, the environmental data 104 includes image data 104a.

In some implementations, the one or more sensors include a depth sensor and the environmental data includes depth data captured by the depth sensor (e.g., a depth camera). For example, as shown in FIG. 2, in some implementations, the environmental data 104 includes depth data 104b that is captured by the depth sensor.

As represented by block 320b, in some implementations, the device includes a display, and obtaining the environmental data includes displaying, on the display, a prompt to obtain (e.g., capture) additional environmental data corresponding to the first portion of the physical environment in response to the first saliency value being greater than a threshold saliency value. For example, as shown in FIG. 1G, in some implementations, the electronic device 100 displays the notification 160 to capture a close-up of the painting 16. As another example, as shown in FIG. 1H, in some implementations, the electronic device 100 displays the notification 162 to capture additional images of the statue 20. In some implementations, the prompt requests the user to scan an object (e.g., a front of a face) an additional time. In some implementations, the prompt requests the user to scan an object more slowly (e.g., to scan the face more slowly). Prompting the user to capture additional environmental data for more salient portions of the physical environment allows the device to model the more salient portions of the physical environment with additional modeling features thereby enhancing a user experience provided by the device.

As represented by block 320c, in some implementations, obtaining the environmental data includes obtaining a first amount of environmental data corresponding to the first portion of the physical environment, and obtaining a second amount of environmental data corresponding to the second portion of the physical environment. In some implementations, the first amount of environmental data is a function of the first saliency value and the second amount of environmental data is a function of the second saliency value. In some implementations, the first amount of environmental data is a function of (e.g., proportional to) the first saliency value and the second amount of environmental data is a function of (e.g., proportional to) the second saliency value. In some implementations, the first amount of environmental data is greater than the second amount of environmental data in response to the first saliency value being greater than the second saliency value. For example, as shown in FIG. 1H, the electronic device 100 is in the process of obtaining additional images of the head 22 but not the base 26 because the statue head saliency value 30c is greater than the statue base saliency value 30e. Capturing and storing fewer environmental data values for less salient portions of the physical environment tends to enhance operability of the device by reducing an amount of memory that is used to store the environmental data.

In some implementations, obtaining the first amount of environmental data includes capturing a first number of images of the first portion of the physical environment and obtaining the second amount of environmental data includes capturing a second number of images of the second portion of the physical environment. In some implementations, the first number of images is a function of (e.g., proportional to) the first saliency value and the second number of images is a function of (e.g., proportional to) the second saliency value. In some implementations, the first number of images is greater than the second number of images in response to the first saliency value being greater than the second saliency value. For example, as shown in FIG. 1H, the electronic device 100 is in the process of obtaining additional images of the head 22 but not the torso 24 because the statue head saliency value 30c is greater than the statue torso saliency value 30d. Capturing and storing fewer images for less salient portions of the physical environment tends to enhance operability of the device by reducing an amount of memory that is used to store the images.

In some implementations, obtaining the first amount of environmental data includes performing a first number of scans of the first portion of the physical environment and performing a second number of scans of the second portion of the physical environment. In some implementations, the first number of scans is a function of (e.g., proportional to) the first saliency value and the second number of scans is a function of (e.g., proportional to) the second saliency value. In some implementations, the first number of scans is greater than the second number of scans in response to the first saliency value being greater than the second saliency value. Since more scans lead to more power consumption, performing fewer scans of the second portion of the physical environment tends to reduce power consumption of the device thereby enhancing operability of the device.

In some implementations, obtaining the first amount of environmental data includes scanning the first portion of the physical environment at a first scanning speed and scanning the second portion of the physical environment at a second scanning speed that is different from the first scanning speed. In some implementations, the first scanning speed is a function of (e.g., inversely proportional to) the first saliency value and the second scanning speed is a function of (e.g., inversely proportional to) the second saliency value. In some implementations, the first scanning speed is less than the second scanning speed in response to the first saliency value being greater than the second saliency value. Scanning the second portion of the physical environment at the second scanning speed instead of the first scanning speed tends to reduce a total amount of scanning time required for scanning the physical environment. Reducing the total amount of scanning time tends to reduce power consumption of the device by keeping the environmental sensor on for a shorter time duration.

In some implementations, obtaining the first amount of environmental data includes scanning the first portion of the physical environment over a first time duration and scanning the second portion of the physical environment over a second time duration that is different from the first time duration. In some implementations, the first time duration is a function of (e.g., proportional to) the first saliency value and the second time duration is a function of (e.g., proportional to) the second saliency value. In some implementations, the first time duration is greater than the second time duration in response to the first saliency value being greater than the second saliency value. Scanning the second portion of the physical environment over the second time duration instead of the first time duration tends to reduce a total amount of scanning time required for scanning the physical environment. Reducing the total amount of scanning time tends to reduce power consumption of the device by keeping the environmental sensor on for a shorter time duration.

In some implementations, obtaining the first amount of environmental data includes scanning the first portion of physical environment at a first scanning resolution and scanning the second portion of the physical environment at a second scanning resolution that is different from the first scanning resolution. In some implementations, the first scanning resolution is a function of (e.g., proportional to) the first saliency value and the second scanning resolution is a function of (e.g., proportional to) the second saliency value. In some implementations, the first scanning resolution is greater than the second scanning resolution in response to the first saliency value being greater than the second saliency value. Since scanning at the first scanning resolution may be more resource-intensive than scanning at the second scanning resolution, scanning the second portion of the physical environment at the second scanning resolution tends to enhance operability of the device by conserving computing resources.

In some implementations, scanning the first portion of the physical environment at the first scanning resolution results in a first density of points in a 3D point cloud of the physical environment, and scanning the second portion of the physical environment at the second scanning resolution results in a second density of points in the point cloud that is different from the first density of points. In some implementations, the density of points in the point cloud is proportional to the scanning resolution. As such, scanning a portion of a physical environment at a relatively high scanning resolution results in more points than scanning the portion of the physical environment at a relatively low scanning resolution.

In some implementations, scanning the first portion of the physical environment at the first scanning resolution results in a first density of vertices in a 3D mesh of the physical environment, and scanning the second portion of the physical environment at the second scanning resolution results in a second density of vertices in the mesh that is different from the first density of vertices. In some implementations, the density of vertices in the mesh is proportional to the scanning resolution. As such, scanning a portion of a physical environment at a relatively high scanning resolution results in more vertices than scanning the portion of the physical environment at a relatively low scanning resolution.

In some implementations, scanning the first portion of the physical environment at the first scanning resolution results in a first density of pixels in an image of the physical environment, and scanning the second portion of the physical environment at the second scanning resolution results in a second density of pixels in the image that is different from the first density of pixels. In some implementations, the density of pixels in the image is proportional to the scanning resolution. As such, scanning a portion of a physical environment at a relatively high scanning resolution results in more pixels than scanning the portion of the physical environment at a relatively low scanning resolution.

In some implementations, scanning the first portion of the physical environment at the first scanning resolution results in a first density of polygons in a texture map of the physical environment, and scanning the second portion of the physical environment at the second scanning resolution results in a second density of polygons in the texture map that is different from the first density of polygons. In some implementations, the density of polygons in the texture map is proportional to the scanning resolution. As such, scanning a portion of a physical environment at a relatively high scanning resolution results in more polygons than scanning the portion of the physical environment at a relatively low scanning resolution.

As represented by block 330, in some implementations, the method 300 includes generating, based on the environmental data, a model of the physical environment by modeling the first portion with a first set of modeling features that is a function of the first saliency value and modeling the second portion with a second set of modeling features that is a function of the second saliency value. For example, as shown in FIG. 1B, the model 110 represents different portions of the physical environment 10 with different sets of modeling features 130 (e.g., the model 110 models the couch 14 with the couch modeling features 130*a*, the painting 16 with the painting modeling features 130*b*, etc.). In some implementations, the device uses more resource-intensive modeling features to model more salient portions of the physical environment and less resource-intensive modeling features to model less salient portions of the physical environment. Using less resource-intensive modeling features to model less salient portions of the physical environment enhances operability of the device by conserving computing resources.

As represented by block 330*a*, in some implementations, generating the model includes synthesizing a graphical environment that represents the physical environment. In some implementations, a first portion of the graphical environment that corresponds to the first portion of the physical environment utilizes the first set of modeling features to represent the first portion of the physical environment and a second portion of the graphical environment that corresponds to the second portion of the physical environment utilizes the second set of modeling features to represent the second portion of the physical environment. In some implementations, utilizing the first set of modeling features to represent the first portion of the physical environment includes utilizing a first display resolution for the first portion of the graphical environment. In some implementations, utilizing the second set of modeling features to represent the second portion of the physical environment includes utilizing a second display resolution for the second portion of the graphical environment. In some implementations, the first display resolution is a function of (e.g., proportional to) the first saliency value and the second display resolution is a function of (e.g., proportional to) the second saliency value. In some implementations, the first display resolution is greater than the second display resolution in response to the first saliency value being greater than the second saliency value. Since displaying content at a higher display resolution may be more resource-intensive, using a lower display resolution to display portions of the model that correspond to less salient portions of the physical environment tends to enhance operability of the device by using fewer computing resources.

In some implementations, the first set of modeling features includes a first number of pixels that the first portion of the graphical environment utilizes to represent the first portion of the physical environment and the second set of modeling features includes a second number of pixels that the second portion of the graphical environment utilizes to represent the second portion of the physical environment. In some implementations, the first number of pixels is a function of (e.g., proportional to) the first saliency value and the second number of pixels is a function of (e.g., proportional to) the second saliency value. In some implementations, the first number of pixels is greater than the second number of pixels in response to the first saliency value being greater than the second saliency value. As an example, as described in relation to FIG. 1C, in some implementations, the electronic device 100 displays the model head 122 with a higher pixel density than the model base 126. Since displaying content with more pixels may require more computing resources, using fewer pixels to display portions of the model that correspond to less salient portions of the physical environment tends to enhance operability of the device by using fewer computing resources.

As represented by block 330b, in some implementations, generating the model includes synthesizing a texture map of the physical environment. In some implementations, a first portion of the texture map that corresponds to the first portion of the physical environment utilizes the first set of modeling features and a second portion of the texture map that corresponds to the second portion of the physical environment utilizes the second set of modeling features. In some implementations, the first set of modeling features includes a first number of polygons that the first portion of the texture map utilizes to model the first portion of the physical environment and the second set of modeling features includes a second number of polygons that the second portion of the texture map utilizes to model the second portion of the physical environment.

In some implementations, generating the model comprises synthesizing a UV map including a first portion that utilizes the first set of modeling features to model the first portion of the physical environment and a second portion that utilizes the second set of modeling features to model the second portion of the physical environment. In some implementations, the first set of modeling features includes a first number of polygons that the first portion of the UV map utilizes to model the first portion of the physical environment and the second set of modeling features includes a second number of polygons that the second portion of the UV map utilizes to model the second portion of the physical environment.

In some implementations, the first number of polygons is a function of (e.g., proportional to) the first saliency value and the second number of polygons is a function of (e.g., proportional to) the second saliency value. In some implementations, the first number of polygons is greater than the second number of polygons in response to the first saliency value being greater than the second saliency value. As an example, as described in relation to FIG. 1C, in some implementations, the electronic device 100 uses a higher polygon density for the model head 122 than the model base 126. Since using more polygons may require more computing resources, using fewer polygons for portions of the model that correspond to less salient portions of the physical environment tends to enhance operability of the device by using fewer computing resources.

As represented by block 330c, in some implementations, the first set of modeling features includes a first number of modeling features that is a function of (e.g., proportional to) the first saliency value and the second set of modeling features includes a second number of modeling features that is a function of (e.g., proportional to) the second saliency value. In some implementations, the first number of modeling features is greater than the second number of modeling features in response to the first saliency value being greater than the second saliency value. As an example, as shown in FIG. 1C, the model painting 116 and the model head 122 use the first modeling feature density 132a that is greater than the second modeling feature density 132b used by the remaining objects in the model 110. Since using more modeling features may require more computing resources, using fewer modeling features for portions of the model that correspond to less salient portions of the physical environment tends to enhance operability of the device by using fewer computing resources.

As represented by block 330d, in some implementations, the model includes a first object representing the first portion of the physical environment and a second object representing the second portion of the physical environment. In some implementations, the first set of modeling features includes an affordance in response to the first saliency value being greater than a threshold saliency value. In some implementations, the affordance allows a user of the device to manipulate the first object. Alternatively or additionally, in some implementations, the affordance allows the user of the device to view information regarding the first object. In some implementations, the second set of modeling features does not include an affordance in response to the second saliency value being less than the threshold saliency value. For example, the device does not composite an affordance that allows the user to manipulate the second object or view information regarding the second object. As shown in FIGS. 1I and 1J, the electronic device 100 composites the affordances 170, 172 and 174 adjacent to the model painting 116 and the model head 122. Since affordances occupy display area, forgoing the display of affordances for portions of the model that correspond to less salient portions of the physical environment tends to prevent cluttering the display. Since displaying an affordance and responding to an activation of the affordance requires computing resources, forgoing the display of affordances for portions of the model that correspond to less salient portions of the physical environment tends to conserve computing resources.

Figure 4:
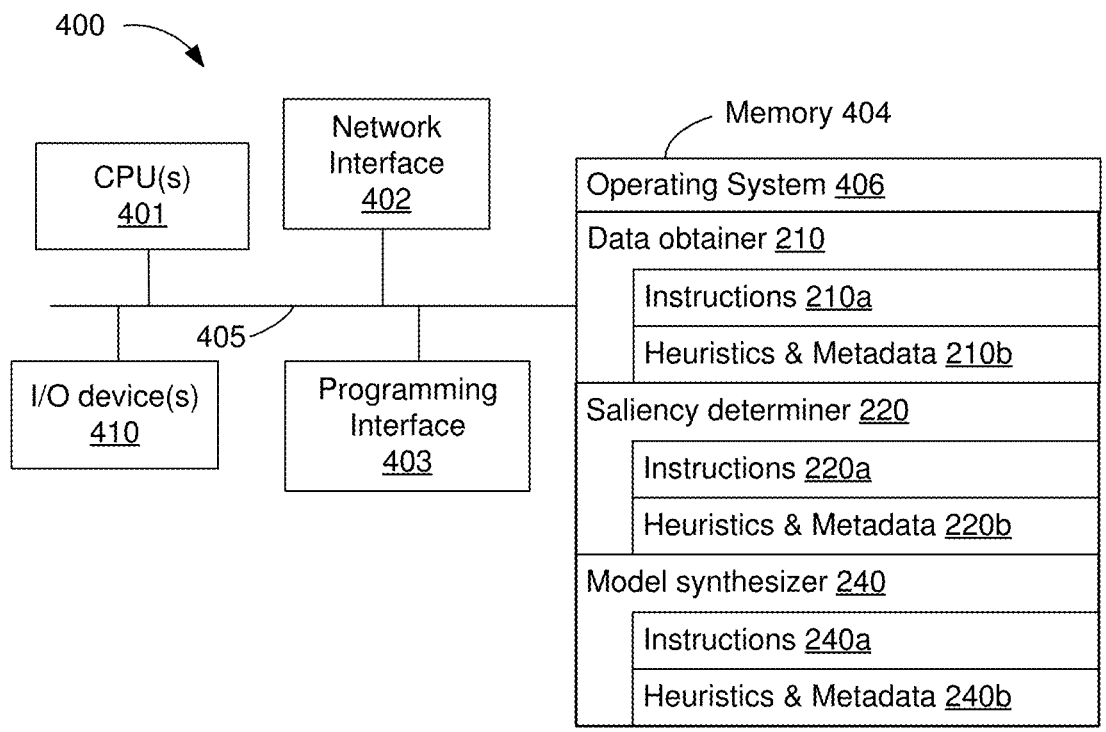
FIG. 4 is a block diagram of a device that generates a model of a physical environment in accordance with some implementations.

FIG. 4 is a block diagram of a device 400 in accordance with some implementations. In some implementations, the device 400 implements the electronic device 100 shown in FIGS. 1A-1K, and/or the modeling engine 200 shown in FIGS. 1A-2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the saliency determiner 220 and the model generator 250. In various implementations, the device 400 performs the method 300 shown in FIG. 3.

In some implementations, the data obtainer 210 includes instructions 210a, and heuristics and metadata 210b for obtaining environmental data and/or user inputs. In some implementations, the data obtainer 210 performs at least some of the operation(s) represented by block 320 in FIG. 3.

In some implementations, the saliency determiner 220 includes instructions 220a, and heuristics and metadata 220b for determining saliency values for portions of a physical environment. In some implementations, the saliency determiner 220 performs at least some of the operation(s) represented by block 310 in FIG. 3.

In some implementations, the model synthesizer 240 includes instructions 240a, and heuristics and metadata 240b for synthesizing a model of the physical environment based on the saliency values determined by the saliency determiner 220 and the environmental data obtained by the data obtainer 210. In some implementations, the model synthesizer 240 performs at least some of the operation(s) represented by block 330 in FIG. 3.

In some implementations, the one or more I/O devices 410 include an environmental sensor for obtaining environmental data (e.g., the environmental data 104 shown in FIGS. 1A and 2). In some implementations, the one or more I/O devices 410 include an image sensor (e.g., a camera) to capture the image data 104a shown in FIG. 2. In some implementations, the one or more I/O devices 410 include a depth sensor (e.g., a depth camera) to capture the depth data 104b shown in FIG. 2. In some implementations, the one or more I/O devices 410 include a display for displaying a model (e.g., for displaying the model 110 shown in FIGS. 1B, 1C and 1I-1K, and/or the model 242 shown in FIG. 2).

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
   at a device including one or more sensors, one or more processors and a non-transitory memory:
   determining that a first portion of a physical environment is associated with a first saliency value and a second portion of the physical environment is associated with a second saliency value that is different from the first saliency value;
   obtaining, via the one or more sensors, environmental data corresponding to the physical environment;
   generating, based on the environmental data, a model of the physical environment by modeling the first portion with a first set of modeling features that is a function of the first saliency value and modeling the second portion with a second set of modeling features that is a function of the second saliency value, wherein the second set of modeling features are different from the first set of modeling features; and presenting a graphical environment associated with the model of the physical environment, including: a first portion of the graphical environment that corresponds to the first portion of the physical environment generated based on the first set of modeling features to represent the first portion of the physical environment and a second portion of the graphical environment that corresponds to the second portion of the physical environment generated based on the second set of modeling features to represent the second portion of the physical environment.

2. The method of claim 1, wherein the device further includes an input device, and wherein determining the first saliency value and the second saliency value comprises:
   detecting, via the input device, a set of one or more user inputs specifying the first saliency value and the second saliency value.

3. The method of claim 1, wherein the first portion of the physical environment corresponds to a first physical article in the physical environment and the second portion of the physical environment corresponds to a second physical article in the physical environment.

4. The method of claim 1, wherein the first portion of the physical environment corresponds to a first portion of a physical article in the physical environment and the second portion of the physical environment corresponds to a second portion of the physical article.

5. The method of claim 1, wherein determining the first saliency value and the second saliency value comprises:
   determining the first saliency value based on a first known saliency value of a first object that is within a similarity threshold of the first portion of the physical environment; and
   determining the second saliency value based on a second known saliency value of a second object that is within a similarity threshold of the second portion of the physical environment.

6. The method of claim 1, wherein determining the first saliency value and the second saliency value comprises:
   obtaining a request to generate a model of the physical environment; and
   determining the first saliency value and the second saliency value in response to obtaining the request to generate the model.

7. The method of claim 1, wherein the one or more sensors include an image sensor and the environmental data includes a set of one or more images of the physical environment.

8. The method of claim 1, wherein the one or more sensors include a depth sensor and the environmental data includes depth data captured by the depth sensor.

9. The method of claim 1, wherein the device includes a display, and wherein obtaining the environmental data comprises:
   displaying, on the display, a prompt to obtain additional environmental data corresponding to the first portion of the physical environment in response to the first saliency value being greater than a threshold saliency value.

10. The method of claim 1, wherein obtaining the environmental data comprises:
    obtaining a first amount of environmental data corresponding to the first portion of the physical environment; and
    obtaining a second amount of environmental data corresponding to the second portion of the physical environment, wherein the first amount of environmental data is a function of the first saliency value and the second amount of environmental data is a function of the second saliency value.

11. The method of claim 10, wherein obtaining the first amount of environmental data comprises capturing a first number of images of the first portion of the physical environment and obtaining the second amount of environmental data comprises capturing a second number of images of the second portion of the physical environment.

12. The method of claim 10, wherein obtaining the first amount of environmental data comprises performing a first number of scans of the first portion of the physical environment and performing a second number of scans of the second portion of the physical environment.

13. The method of claim 10, wherein obtaining the first amount of environmental data comprises scanning the first portion of the physical environment at a first scanning speed and scanning the second portion of the physical environment at a second scanning speed that is different from the first scanning speed.

14. The method of claim 10, wherein obtaining the first amount of environmental data comprises scanning the first portion of the physical environment over a first time duration and scanning the second portion of the physical environment over a second time duration that is different from the first time duration.

15. The method of claim 10, wherein obtaining the first amount of environmental data comprises scanning the first portion of physical environment at a first scanning resolution and scanning the second portion of the physical environment at a second scanning resolution that is different from the first scanning resolution.

16. The method of claim 1, wherein generating the model comprises:
    synthesizing a graphical environment that represents the physical environment, wherein a first portion of the graphical environment that corresponds to the first portion of the physical environment utilizes the first set of modeling features to represent the first portion of the physical environment and a second portion of the graphical environment that corresponds to the second portion of the physical environment utilizes the second set of modeling features to represent the second portion of the physical environment.

17. The method of claim 16, wherein the first set of modeling features includes a first number of pixels that the first portion of the graphical environment utilizes to represent the first portion of the physical environment and the second set of modeling features includes a second number of pixels that the second portion of the graphical environment utilizes to represent the second portion of the physical environment.

18. The method of claim 1, wherein generating the model comprises:
    synthesizing a texture map of the physical environment, wherein a first portion of the texture map that corresponds to the first portion of the physical environment utilizes the first set of modeling features and a second portion of the texture map that corresponds to the second portion of the physical environment utilizes the second set of modeling features.

19. The method of claim 1, wherein the first and second sets of modeling features correspond to at least one of different display resolutions, pixel densities, or polygon densities.

20. A device comprising:
    one or more sensors;

one or more processors;
a non-transitory memory; and
one or more programs stored in the non-transitory memory, which, when executed by the one or more processors, cause the device to:
   determine that a first portion of a physical environment is associated with a first saliency value and a second portion of the physical environment is associated with a second saliency value that is different from the first saliency value;
   obtain, via the one or more sensors, environmental data corresponding to the physical environment;
   generate, based on the environmental data, a model of the physical environment by modeling the first portion with a first set of modeling features that is a function of the first saliency value and modeling the second portion with a second set of modeling features that is a function of the second saliency value, wherein the second set of modeling features are different from the first set of modeling features; and
   present a graphical environment associated with the model of the physical environment, including: a first portion of the graphical environment that corresponds to the first portion of the physical environment generated based on the first set of modeling features to represent the first portion of the physical environment and a second portion of the graphical environment that corresponds to the second portion of the physical environment generated based on the second set of modeling features to represent the second portion of the physical environment.

21. A non-transitory memory storing one or more programs, which, when executed by one or more processors of a device, cause the device to:
   determine that a first portion of a physical environment is associated with a first saliency value and a second portion of the physical environment is associated with a second saliency value that is different from the first saliency value;
   obtain, via the one or more sensors, environmental data corresponding to the physical environment;
   generate, based on the environmental data, a model of the physical environment by modeling the first portion with a first set of modeling features that is a function of the first saliency value and modeling the second portion with a second set of modeling features that is a function of the second saliency value, wherein the second set of modeling features are different from the first set of modeling features; and
   present a graphical environment associated with the model of the physical environment, including: a first portion of the graphical environment that corresponds to the first portion of the physical environment generated based on the first set of modeling features to represent the first portion of the physical environment and a second portion of the graphical environment that corresponds to the second portion of the physical environment generated based on the second set of modeling features to represent the second portion of the physical environment.

* * * * *